(12) United States Patent  
Murashima et al.

(10) Patent No.: US 11,079,014 B2  
(45) Date of Patent: Aug. 3, 2021

(54) TRAVELING HYDRAULIC STEPLESS TRANSMISSION

(71) Applicant: Kanzaki Kokyukoki Mfg. Co., Ltd., Amagasaki (JP)

(72) Inventors: Daisuke Murashima, Amagasaki (JP); Michio Tsukamoto, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 16/590,069

(22) Filed: Oct. 1, 2019

(65) Prior Publication Data

US 2020/0103011 A1 Apr. 2, 2020

(30) Foreign Application Priority Data

Oct. 1, 2018 (JP) .............................. JP2018-186998

(51) Int. Cl.
*F16H 61/4026* (2010.01)
*F16H 61/439* (2010.01)

(52) U.S. Cl.
CPC ....... *F16H 61/439* (2013.01); *F16H 61/4026* (2013.01)

(58) Field of Classification Search
CPC ............. F16H 61/4017; F16H 61/4026; F16H 61/4035; F16H 61/439; F16H 39/10; F16D 31/08
See application file for complete search history.

(56) References Cited

U.S. PATENT DOCUMENTS

| 5,356,347 A * | 10/1994 | Komura | B60K 17/105 474/18 |
| 5,836,159 A * | 11/1998 | Shimizu | B60T 1/093 60/487 |
| 7,191,594 B2 * | 3/2007 | Okada | B60K 17/105 60/433 |
| 2016/0348654 A1 | 12/2016 | Yasuda et al. | |

FOREIGN PATENT DOCUMENTS

JP 2016223434 A 12/2016

* cited by examiner

*Primary Examiner* — F Daniel Lopez  
(74) *Attorney, Agent, or Firm* — Sterne, Kessler, Goldstein & Fox P.L.L.C.

(57) ABSTRACT

A traveling hydraulic stepless transmission ("HST"), ensures stopping of a vehicle on a slope under high load conditions, maintains stopping the vehicle on flat ground under low load conditions, and enables smooth starting from a stop. The HST includes a neutral check valve ("NCV") and an internal damping system ("IDS"). The NCV includes a first orifice that opens a first oil passage to a transaxle case when a pressure in the first oil passage is equal to or less than a predetermined pressure, and that connects the second oil passage to the transaxle case when a pressure in a second oil passage is equal to or less than the predetermined pressure. The IDS includes second orifices that connect a high pressure side of the oil passages to the transaxle case when a discharge rate of the hydraulic pump is equal to or less than a predetermined discharge rate.

5 Claims, 16 Drawing Sheets

Neutral position

Low pressure side

Forward position
(Backward position)

High pressure side

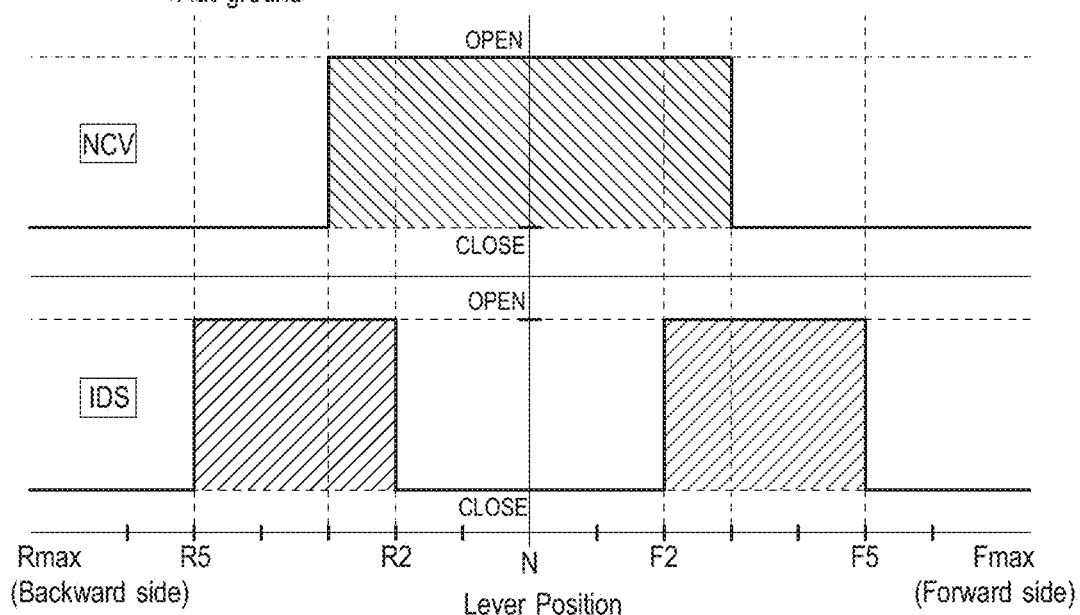
FIG.16A <Flat ground>
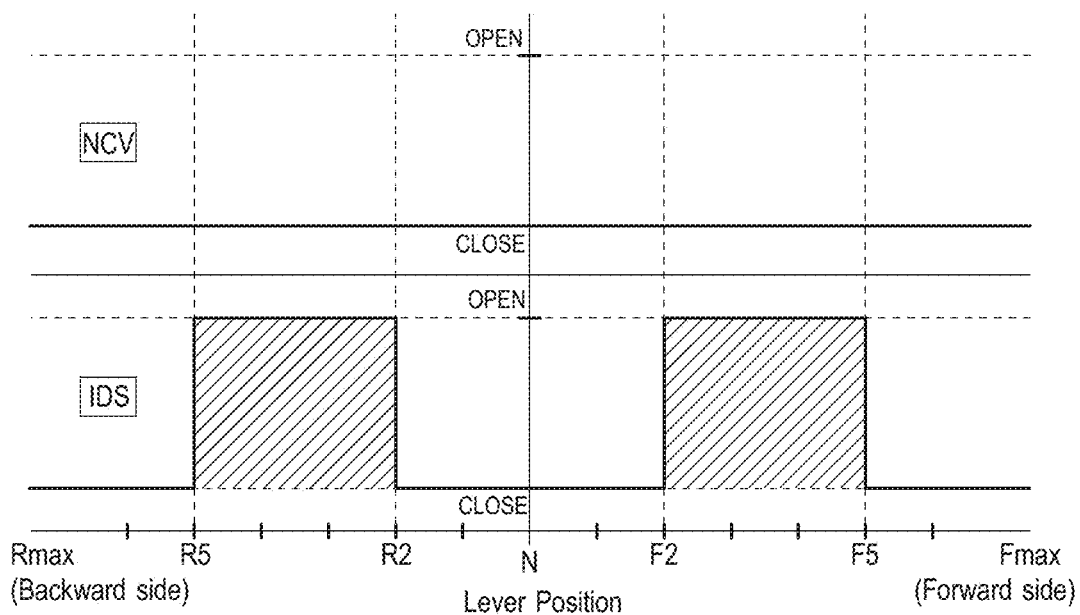
FIG.16B <Slope ground>

TRAVELING HYDRAULIC STEPLESS TRANSMISSION

BACKGROUND OF THE INVENTION

(1) Field of the Invention

The present invention relates to a traveling hydraulic stepless transmission.

(2) Description of Related Art

There is known a traveling hydraulic stepless transmission ("HST") in which a hydraulic pump and a hydraulic motor are fluidly connected. Conventionally, in such a hydraulic stepless transmission, it is possible to switch between forward movement and backward movement of a vehicle by changing an angle of a movable swash plate of a variable displacement hydraulic pump, and it is possible to stop the vehicle by setting the swash plate angle to a neutral position. As a hydraulic stepless transmission with such a configuration, there is known a configuration in which an orifice is provided in order to expand a neutral region of the movable swash plate, which is disclosed in JP-A 2016-223434 discussed below, for example. In the technique disclosed in JP-A 2016-223434, an orifice is provided in a charge valve unit so as to bypass a check valve and a relief valve.

SUMMARY OF THE INVENTION

In the technique disclosed in JP-A 2016-223434, since the orifice is always open, hydraulic oil always leaks from the orifice. Such hydraulic oil leakage is effective for extension of the neutral position, and does not cause a problem in a driving range under low load conditions. However, in a driving range under high load conditions, the hydraulic oil leakage from the orifice is a factor causing deterioration of transmission efficiency.

The present invention has been made in view of such current problems, and an object of the present invention is to provide a traveling hydraulic stepless transmission that makes it possible to improve operation efficiency by closing an orifice for expansion of a neutral region of a movable swash plate when in a high-speed driving range.

A traveling hydraulic stepless transmission according to the present invention includes a tank of hydraulic oil, a hydraulic pump of a variable displacement type, a capacity adjustment part disposed in the hydraulic pump, and a hydraulic motor. Also included are a first oil passage and a second oil passage that fluidly connect the hydraulic pump and the hydraulic motor and a first valve mechanism and a second valve mechanism that enable the first oil passage and the second oil passage to be fluidly connected to the tank. The first valve mechanism includes a first orifice that fluidly connects the first oil passage to the tank when a hydraulic oil pressure in the first oil passage is equal to or less than a predetermined pressure. The first valve mechanism also fluidly connects the second oil passage to the tank when a hydraulic oil pressure in the second oil passage is equal to or less than the predetermined pressure. The second valve mechanism includes a second orifice that fluidly connects a high pressure side of the first oil passage or the second oil passage to the tank when the a discharge rate of the hydraulic pump is equal to or less than a predetermined discharge rate.

In addition, the traveling hydraulic stepless transmission according to the present invention is a traveling hydraulic stepless transmission including: a hydraulic pump, a movable swash plate disposed in the hydraulic pump, a hydraulic motor, and a closed circuit that fluidly connects the hydraulic pump and the hydraulic motor comprising a first oil passage and a second oil passage. Also included is an internal damping system comprising: a pair of pistons individually disposed in each of the first oil passage and the second oil passage, a plate that cooperates with the movable swash plate and is in sliding contact with the pair of pistons, two holes disposed on a surface of each of the pair of pistons in contact with the plate, and a groove formed on a locus of a position facing the hole on a surface of the plate in contact with the pair of pistons, wherein the plate is configured to be attachable to and detachable from one of the pair of trunnion shafts.

Further, in the traveling hydraulic stepless transmission according to the present invention, the plate includes a sealing part that seals the hole in the groove at a position that faces the hole when the plate is turned to a neutral position.

In addition, in the traveling hydraulic stepless transmission according to the present invention, the movable swash plate is formed with a protrusion having a pair of protrusion-side flat portions parallel to a normal direction of a turning shaft of the movable swash plate, wherein the plate is formed with a recess having a pair of parallel recess-side flat portions corresponding to the protrusion-side flat portions, and wherein the plate is attached to the movable swash plate by fitting the protrusion to the recess.

Further, the traveling hydraulic stepless transmission according to the present invention is a traveling hydraulic stepless transmission formed with: a tank of hydraulic oil, hydraulic pump of a variable displacement type, a capacity adjustment part disposed in the hydraulic pump, a hydraulic motor, a closed circuit that fluidly connects the hydraulic pump and the hydraulic motor in a closed circuit, and a pair of neutral check valves configured for replenishment of hydraulic oil that are disposed individually in each of a first oil passage and a second oil passage of the closed circuit. Each of the pair of check valves comprises: a valve housing that is a cylindrical housing, a first oil chamber formed on one end side of the valve housing in a cylinder axial direction, a second chamber formed on another end side of the valve housing in the cylinder axial direction, a communication hole connecting the first oil chamber and the second chamber, a first open hole to fluidly connect the first oil chamber to the first oil passage or the second oil passage, a second open hole to fluidly connect the second chamber to the tank, and a cylindrical body inserted through the communication hole to be displaceable in the cylinder axial direction, wherein the cylindrical body is formed with an oil hole passing through in a axial direction of the cylindrical body. Also included in the check valve is orifice opened on an outer peripheral surface of the cylindrical body and communicating with the oil hole, and a first seat surface formed at an end portion on a side facing the first oil chamber, a spring member configured to bias the cylindrical body toward the first oil chamber; and a valve body housed in the first oil chamber, wherein the valve housing is formed with a second seat surface positioned on the first oil chamber side in the cylinder axial direction. When a pressure in either the first oil passage or the second oil passage is equal to or less than an urging force acting on the cylindrical body, the valve body of the corresponding neutral check valve is brought into pressure contact with the first seat surface and separated from the second seat surface by the cylindrical body being displaced to the first oil chamber side, and the first oil passage and the second oil passage are made to fluidly communicate with the tank through the orifice. When a pressure in the first oil passage or the second oil passage becomes higher than an the biasing force of the spring member, the valve body of the corresponding neutral check valve is displaced to the second chamber side against the biasing force of the spring member, and is brought into pressure contact with the second seat surface, which shut off fluid communication between the a high pressure side of the first oil passage or the second oil passage and the tank.

In addition, the traveling hydraulic stepless transmission according to the present invention further includes an internal damping system ("IDS") having: a pair of pistons individually disposed in the first oil passage and the second oil passage; a plate connected to a control arm and in sliding contact with the piston; a hole disposed on a surface of the piston in sliding contact with the plate; and a groove formed on a locus of a position facing the hole on a surface of the plate in sliding contact with the piston. The plate drains hydraulic oil from a high pressure side of the first oil passage or the second oil passage to the tank, through the groove when the plate is aligned with the hole, within a predetermined range where the capacity adjustment part passes a neutral position.

According to the traveling hydraulic stepless transmission according to the present invention, a smooth start can be obtained under both low load and high load conditions, for example, such as flat ground and slope ground.

Further, according to the traveling hydraulic stepless transmission according to the present invention, a plate required for an IDS specification can be easily added to a movable swash plate mounted on an existing hydraulic stepless transmission.

Further, according to the traveling hydraulic stepless transmission according to the present invention, near the neutral position under high load conditions, no oil is discharged from either the internal damping system or the charge check valve. This makes it possible to reliably stop the vehicle.

Further, according to the traveling hydraulic stepless transmission according to the present invention, it is possible to easily and accurately position the movable swash plate and the plate. Further, relative rotation between the movable swash plate and the plate can be easily inhibited.

In addition, according to the traveling hydraulic stepless transmission according to the present invention, an amount of leaked oil under high load conditions can be reduced. This allows the orifice to be closed by the valve body of the check valve at a time of stopping the vehicle on a slope, and the vehicle position to be maintained. Further, since the orifice is opened under low load conditions, an amount of leaked oil at a time of neutral under such conditions can be increased, and it is easy to secure a neutral range and improve driving feeling at a time of starting the vehicle on flat ground.

BRIEF DESCRIPTION OF THE DRAWINGS

FIGS. 11A and 11B are views showing an operating condition of the neutral charge check valve, in which FIG. 11A is a cross-sectional view showing a time of neutral, and FIG. 11B is a cross-sectional view showing a time of forward movement and backward movement;

FIGS. 12A to 12C are views showing a plate, in which FIG. 12A is a partial enlarged view showing an attachment state to a trunnion shaft, FIG. 12B is a perspective view showing a formation state of a groove, a sealing part, and a recess, and FIG. 12C is a perspective view showing a formation state of a two-face width:

FIGS. 16A and 16B are views showing an operation timing of the neutral charge check valve and the internal damping system, in which FIG. 16A is a case of flat ground and FIG. 16B is a case of slope ground.

DETAILED DESCRIPTION OF PREFERRED EMBODIMENTS

Figure 1:
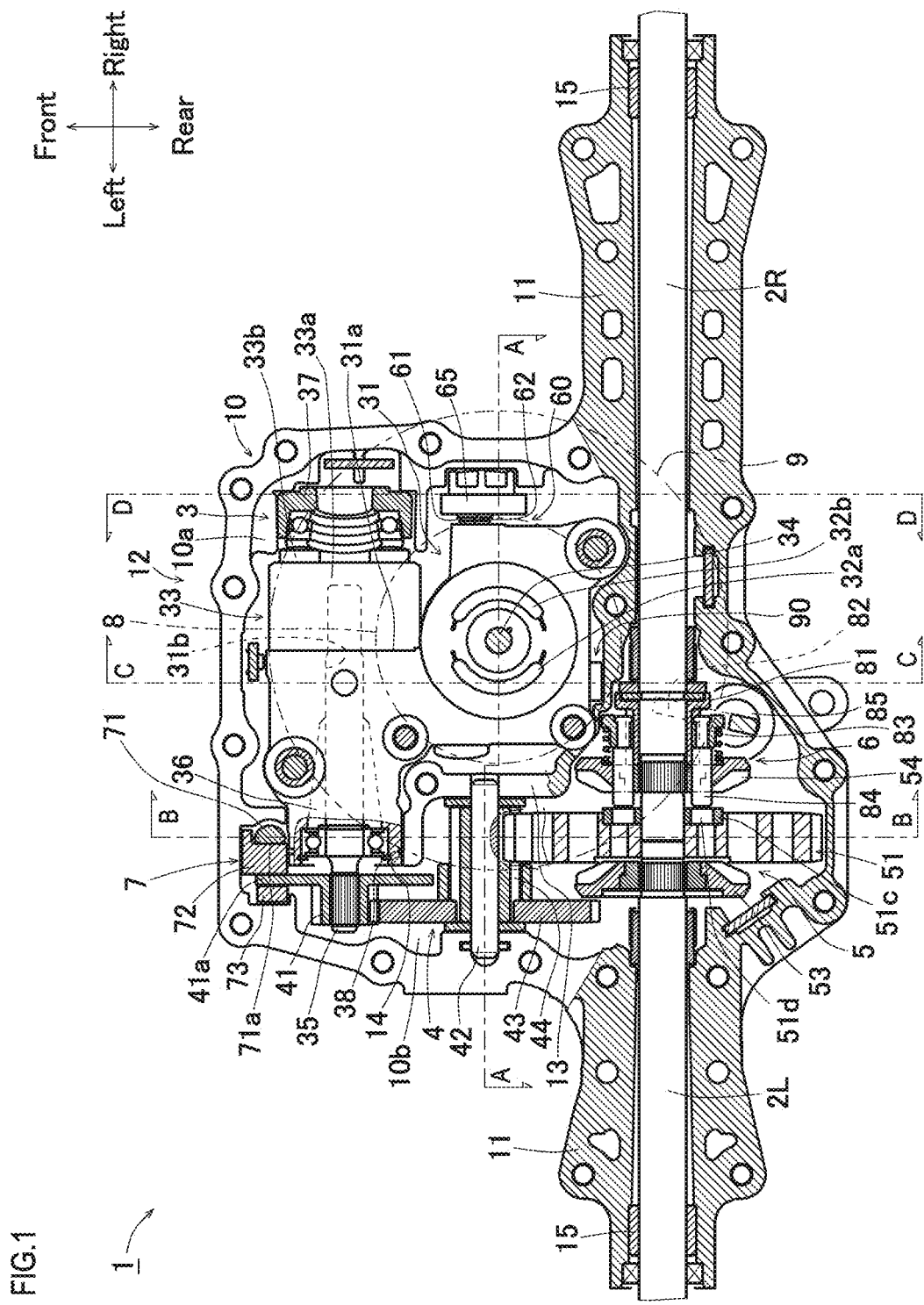
FIG. 1 is a plan partial cross-sectional view of a state where an upper housing of a transaxle is removed.

A configuration of a hydraulic transaxle will be described. In the following description, a front-back direction, a left-right direction, and an up-down direction of the hydraulic transaxle are defined as indicated by arrows in FIGS. 1 to 4.

As shown in FIGS. 1 to 6, a transaxle 1 as an embodiment of a hydraulic transaxle according to the present invention has a transaxle case 10. The transaxle case 10 is configured by fastening an upper housing 11 and a lower housing 12 by a plurality of bolts. The transaxle case 10 is provided with a sealed space therein, and serves as a tank for storing hydraulic oil.

Inside the transaxle case 10, an HST chamber 10a and a gear chamber 10b are formed. An HST 3 is disposed in the HST chamber 10a, and a reduction gear train 4 and a differential gear device 5 are disposed in the gear chamber 10b. Then, an inside of the transaxle case 10 (that is, the HST chamber 10a and the gear chamber 10b) is filled with oil (hydraulic oil) to be used for driving the HST 3 and lubricating the HST 3 and the reduction gear train 4. In the following, a description is given on the assumption that a portion housing the reduction gear train 4 in the gear chamber 10b is arranged along a left side of the HST chamber 10a, and arranged to extend forward from a portion housing the differential gear device 5 in the gear chamber 10b.

A right axle 2R extends so as to pass through the upper housing 11 and is axially supported by a bush (needle bearing) 15 in a right outside end portion of the upper housing 11. A left axle 2L extends so as to pass through the upper housing 11 and is axially supported by a bush 15 in a left end portion of the upper housing 11. An inner end portion of each of the left and right axles 2L and 2R is disposed in a rear portion of the gear chamber 10b. Specifically, the inner end portions of the individual axles 2L and 2R are inserted into an axial core hole of a ring gear 51 in the differential gear device 5 and face each other. The right axle 2R extends rightward from a gear mechanism in the differential gear device 5, is disposed at the rear portion in the gear chamber 10b, and extends in the left-right direction along a rear side of the HST chamber 10a.

The HST 3 includes a center case 31., an axial piston hydraulic pump 39 attached to the center case 31, and an axial piston hydraulic motor 33 attached to the center case 31. The center case 31 has a right end extending along a right side of the HST chamber 10a, a front end being close to a front side of the HST chamber 10a, and a rear end being close to a rear side of the HST chamber 10a. A rear half portion of the center case 31 is formed with a horizontal surface. The hydraulic pump 39 is attached to this horizontal surface, and the hydraulic pump extends upward from the rear half portion of the center case 31.

A lower portion of a vertical pump shaft 34, which is a rotational shaft core of the hydraulic pump 39 (that is, an input shaft of the HST 3), is axially supported in the rear half portion of the center case 31, extends upward, and has an upper end portion protruding upward from an upper end of the upper housing 11 of the transaxle case 10. To the upper end portion of the pump shaft 34, an input pulley 8 and a cooling fan 9 are fixed. Around the input pulley 8, a belt (not shown) is wound, and the input pulley 8 is drivingly connected to a motor such as an internal combustion engine, via the belt.

The transaxle 1 supporting each of the axles 2L and 2R as an axle part is configured such that power from a motor (not shown) is inputted from the input pulley 8 provided on the pump shaft 34, and the power is outputted to the left and right axles 2L and 2R via the reduction gear train 4 and the differential gear device 5.

A front half of the center case 31 is formed with a vertical surface 31a serving as a receiving part of the hydraulic motor 33. The hydraulic motor 33 is attached to the vertical surface 31a, and the hydraulic motor 33 extends to the right from the front half of the center case 31. A laterally horizontal output shaft 35, which is a rotational shaft core of the hydraulic motor 33 (that is, an output shaft of the HST 3) has a right portion being axially supported by a shaft hole 31b formed in the front half of the center case 31. Further, a left portion of the output shaft 35 is axially supported by a shaft support part 36 serving as a receiving part of the output shaft 35 extending leftward from the front half portion of the center case 31. Then, the output shaft 35 of the hydraulic motor 33 extends in the center case 31 toward the vertical surface 31a and toward the shaft support part 36.

The vertical surface 31a as an attachment surface of the hydraulic motor 33 rotatably supports a cylinder block 33a. Further, a plurality of reciprocating pistons 33b, 33b, . . . are fitted into a plurality of cylinder holes of the cylinder block 33a via urging springs. Head portions of the pistons 33b, 33b, . . . abut against a fixed swash plate 37. The fixed swash plate 37 is sandwiched and fixed between the upper housing 11 and the lower housing 12. The output shaft 35 is horizontally arranged on a rotational axial center of such a cylinder block 33a and is locked to the cylinder block 33a so as to be relatively non-rotatable, thereby constituting the hydraulic motor 33.

Figure 3:
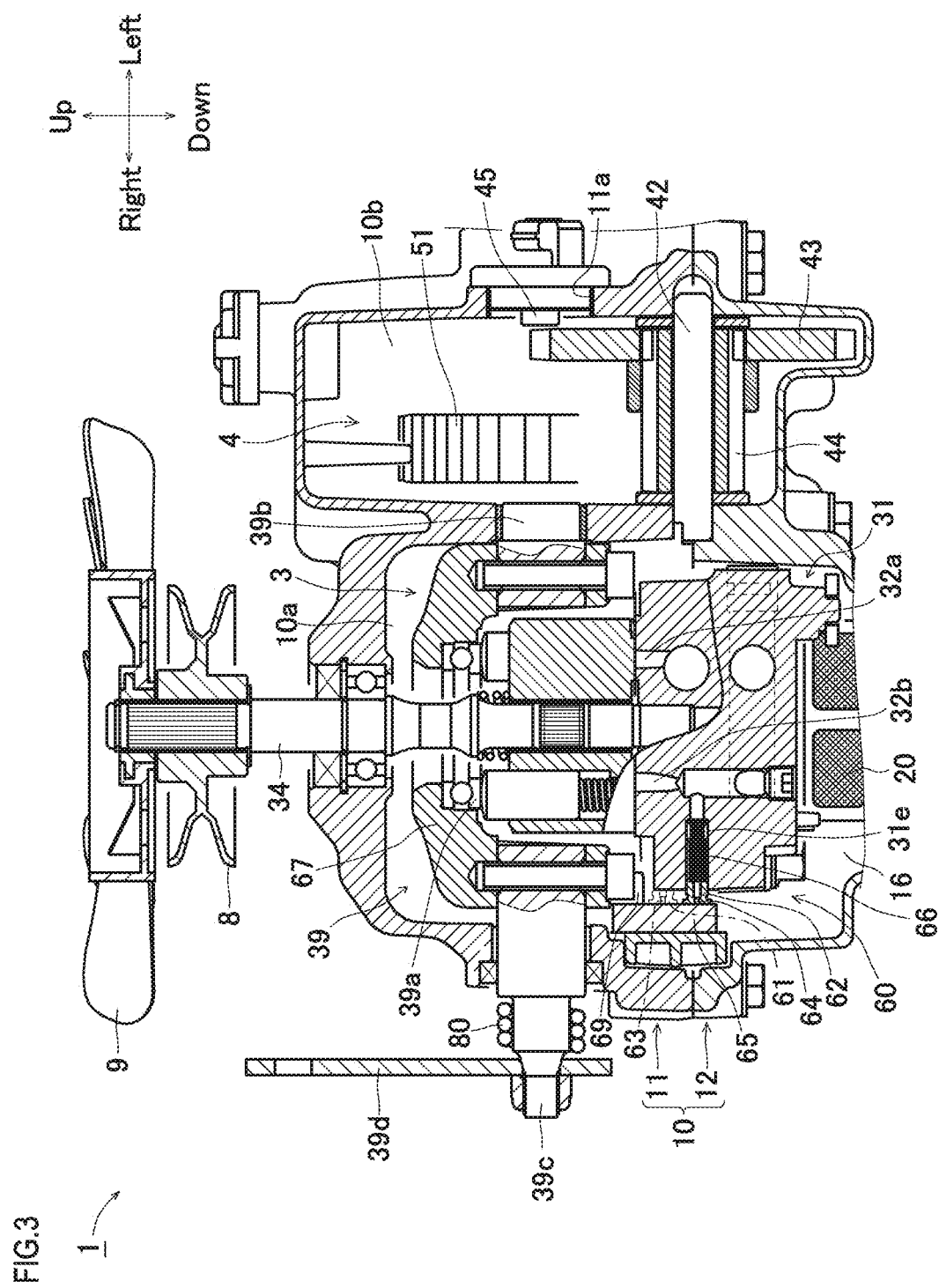
FIG. 3 is a partial cross-sectional arrow view of the transaxle taken along line A-A in FIG. 1.

Next, a description is given to volume changing means that performs tilting operation on a movable swash plate 39a in order to change a hydraulic oil discharge amount and discharge direction of the hydraulic pump 39. As shown in FIG. 3, an intermediate wall that partitions the HST chamber 10a of the upper housing 11 from the gear chamber 10b rotatably supports a first trunnion shaft 39b parallel to the axles 2L and 2R, and a right side wall of the upper housing 11 rotatably supports a second trunnion shaft 39c being parallel to the axles 2L and 2R and extending outside the transaxle case 10. The trunnion shafts 39b and 39c each are arranged on a same axis.

Then, to an outer end portion of the second trunnion shaft 39c, a control lever 39d is attached. Further, to a movable swash plate main body 67 located on an inner end side of each of the trunnion shafts 39b and 39c in the transaxle case 10, there is attached a substantially fan-shaped plate 65 serving as blocking means for orifices 63 and 64 described later. The control lever 39d is connected to a speed change operation tool (not shown) such as a lever or a pedal provided in the vehicle, via a link mechanism (not shown).

In the configuration of such volume changing means by the movable swash plate 39a and the trunnion shafts 39b and 39c each, when the control lever 39d is turned, the movable swash plate 39a can be tilted around the individual trunnion shafts 39b and 39c, and an operation for changing a hydraulic oil discharge of the hydraulic pump 39 is performed. This results in control of a driving rotational speed and rotational direction of the hydraulic motor 33 (output shaft 35).

Figure 6:
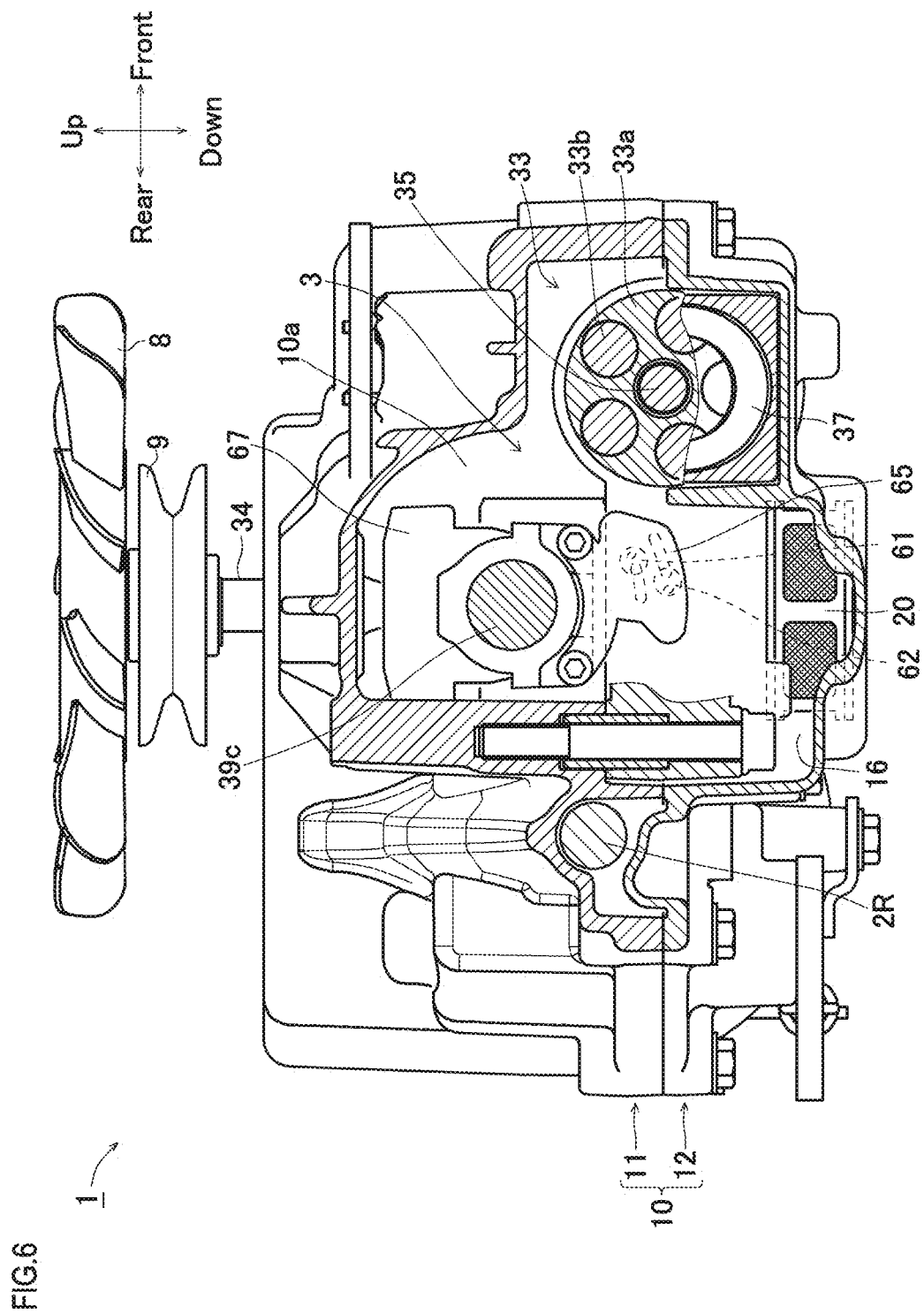
FIG. 6 is a partial cross-sectional arrow view of the transaxle taken along line D-D in FIG. 1.
Figure 7:
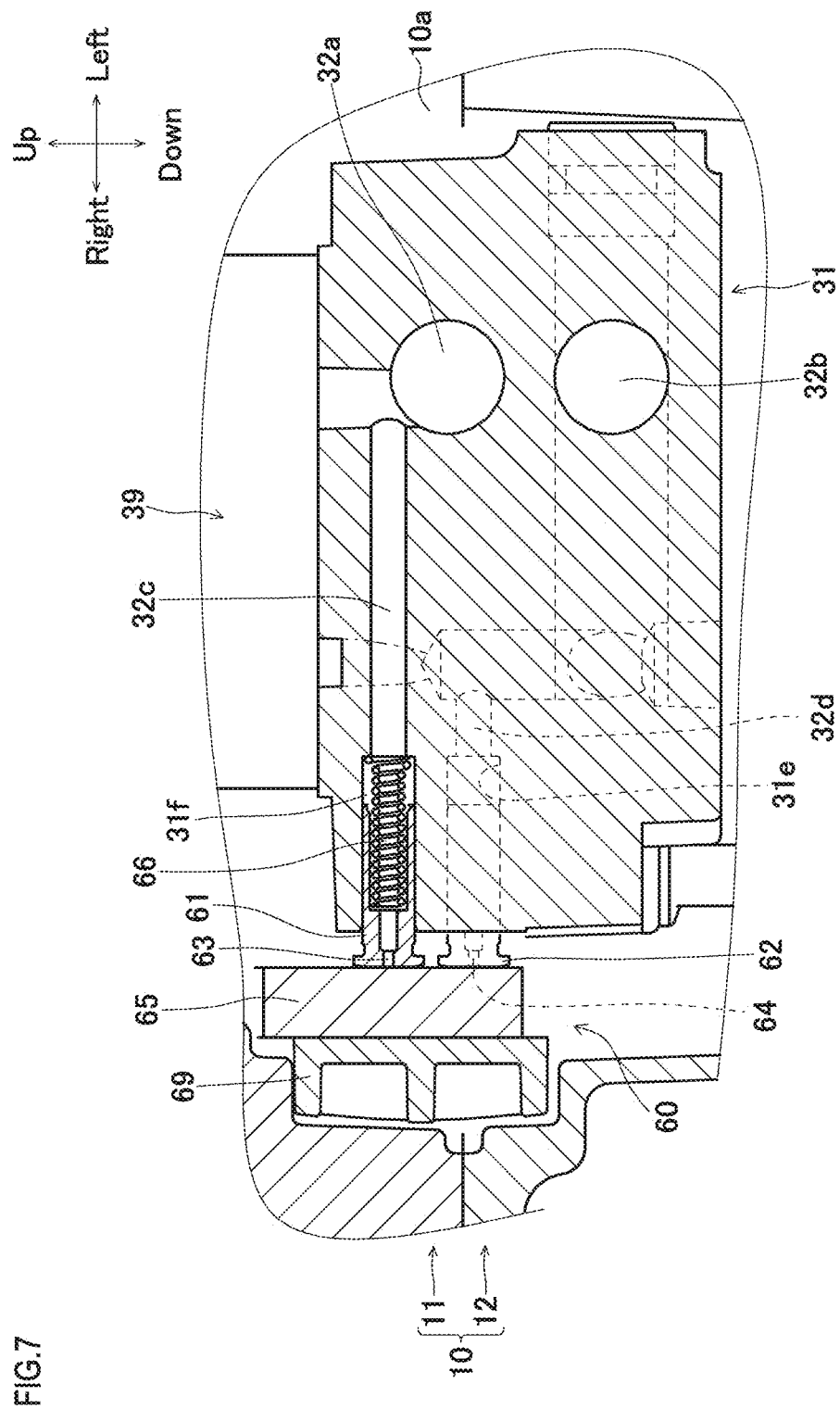
FIG. 7 is a partial cross-sectional view showing an internal damping system.

As shown in FIGS. 3, 6, and 7, oil holes 32c and 32d are respectively branched in vertical rows in the horizontal direction from oil passages 32a and 32b, and outer open ends thereof are closed by an upper piston 61 and a lower piston 62, respectively. However, the upper and lower pistons 61 and 62 are respectively provided with an upper orifice 63 and a lower orifice 64 that are outwardly open and always communicating with the oil passages 32a and 32b, and pressure oil in a closed circuit is in communication with an oil reservoir 16 in the transaxle case 10 through the orifices 63 and 64 (that is, drainable). An internal damping system (IDS) 60 is configured by bringing the plate 65 into constant sliding contact with an outer end surface of each of the pistons 61 and 62. The IDS 60 is provided in order to reduce the impact at a time of dynamic brake and forward/backward starting, by pressing the plate 65 while the movable swash plate 39a as the volume changing means returns to neutral, to reduce a speed of the movable swash plate 39a to return to neutral, and secondarily, by draining pressure oil in the closed circuit through the individual orifices 63 and 64.

Between inner ends of the individual pistons 61 and 62 and inner ends of cylindrical portions 31e and 31f, coil springs 66 and 66 are respectively interposed to urge the individual pistons 61 and 62 outward. That is, the individual pistons 61 and 62 are pressed outward by hydraulic pressure in the oil passages 32a and 32b and an urging force of the coil springs 66 and 66. Then, a friction force of the individual pistons 61 and 62 against the plate 65 by the combination of the hydraulic pressure of the closed circuit and the urging force of the coil springs 66 and 66 is set smaller than that of a neutral return spring 80 (neutral urging means) having a coil shape and a torsional shape and being wound around the first trunnion shaft 39b. Further, in the plate 65, on an opposite side to a side in contact with the individual pistons 61 and 62, a contact member that is in contact with the opposite side of the plate 65 is disposed in order to suppress bending of the plate 65 by being pressed by each of the pistons 61 and 62.

Figure 12A:
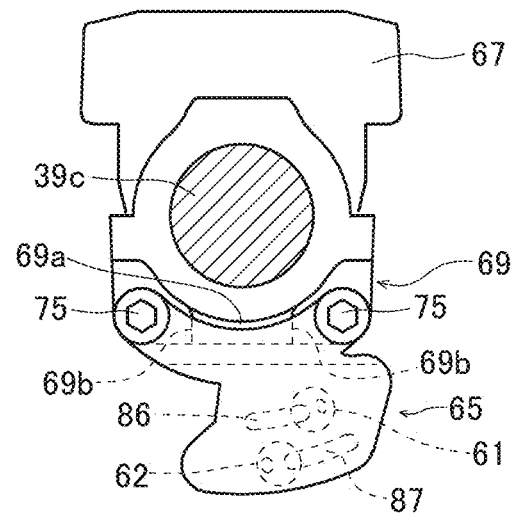
Figure 12B:
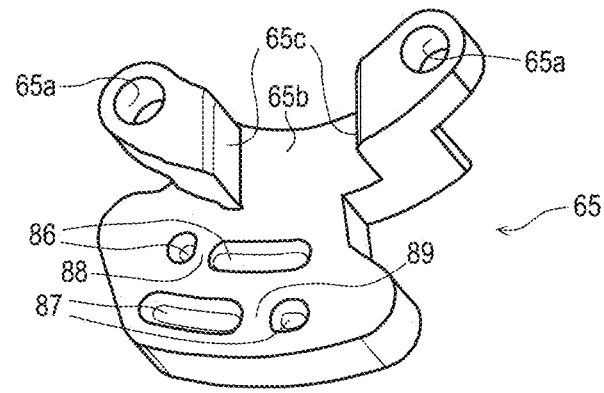
Figure 12C:
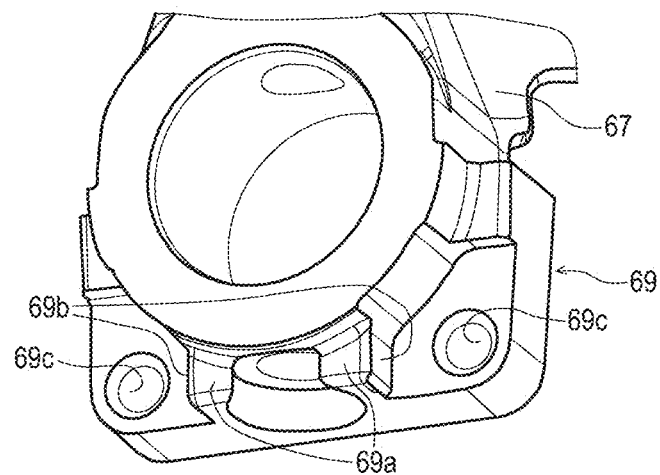

As shown in FIGS. 6, 12A, and 12B, the plate 65 constituting the IDS 60 is fixed to a guide part 69 integral with the movable swash plate main body 67. In the plate 65, bolt holes 65a and 65a for insertion of bolts 75 and 75 are formed. Further, in the guide part 69, nut holes 69c to be screwed with the bolts 75 and 75 are formed. Then, the plate 65 is fixed to the guide part 69 by screwing, into the nut holes, the bolts 75 and 75 inserted through the bolt holes 65a and 65a.

Further, the guide part 69 is formed with a protrusion 69a. The protrusion 69a includes a pair of flat portions 69b and 69b parallel to a normal direction to an axial direction of the second trunnion shaft 39c. Further, the plate 65 is formed with a recess 65b. The recess 65b is a portion of a concave shape having a size and a shape allowing the protrusion 69a to be fitted. Inside the recess 65b, there are formed flat portions 65c and 65c that face the flat portions 69b and 69b when the protrusion 69a is fitted into the recess 65b.

Then, when the plate 65 is fixed to the guide part 69, by the recess 65b being fitted into the protrusion 69a the plate 65 is accurately positioned with respect to the guide part 69, and relative rotation around the axis of the second trunnion shaft 39c with respect to the guide part 69 is inhibited.

Further, on a contact surface of the plate 65 with the individual pistons 61 and 62, grooves 86 and 87 are formed. The groove 86 is a groove formed in a contact region with the upper piston 61, and is configured to allow hydraulic oil to flow out of a first oil passage 32a through the groove 86, when the orifice 63 of the upper piston 61 is located in the groove 86. The groove 87 is a groove formed in a contact region with the lower piston 62, and is configured to allow hydraulic oil to flow out of a second oil passage 32b through the groove 87, when the orifice 64 of the lower piston 62 is located in the groove 87.

Further, the plate 65 is formed with sealing parts 88 and 89. The sealing part 88 is a flat portion formed in a middle portion of the groove 86 so as to eliminate a part of the groove 86. The sealing part 88 is a portion formed to have a predetermined area, around a position on the plate 65 facing the orifice 63 of the upper piston 61, in a state where the movable swash plate main body 67 is turned to the neutral position. The sealing part 89 is a flat portion formed in a middle portion of the groove 87 so as to eliminate a part of the groove 87. The sealing part 89 is a portion formed to have a predetermined area, around a position on the plate 65 facing the orifice 64 of the lower piston 62, in a state where the movable swash plate main body 67 is turned to the neutral position.

While the sealing part 88 is in contact with the orifice 63 of the upper piston 61, the sealing part 88 can seal the orifice 63 to stop the flow of hydraulic oil from the first oil passage 32a. While the sealing part 89 is in contact with the orifice 64 of the lower piston 62, the sealing part 89 can seal the orifice 64 to stop the flow of hydraulic oil from the second oil passage 32b.

Figure 5:
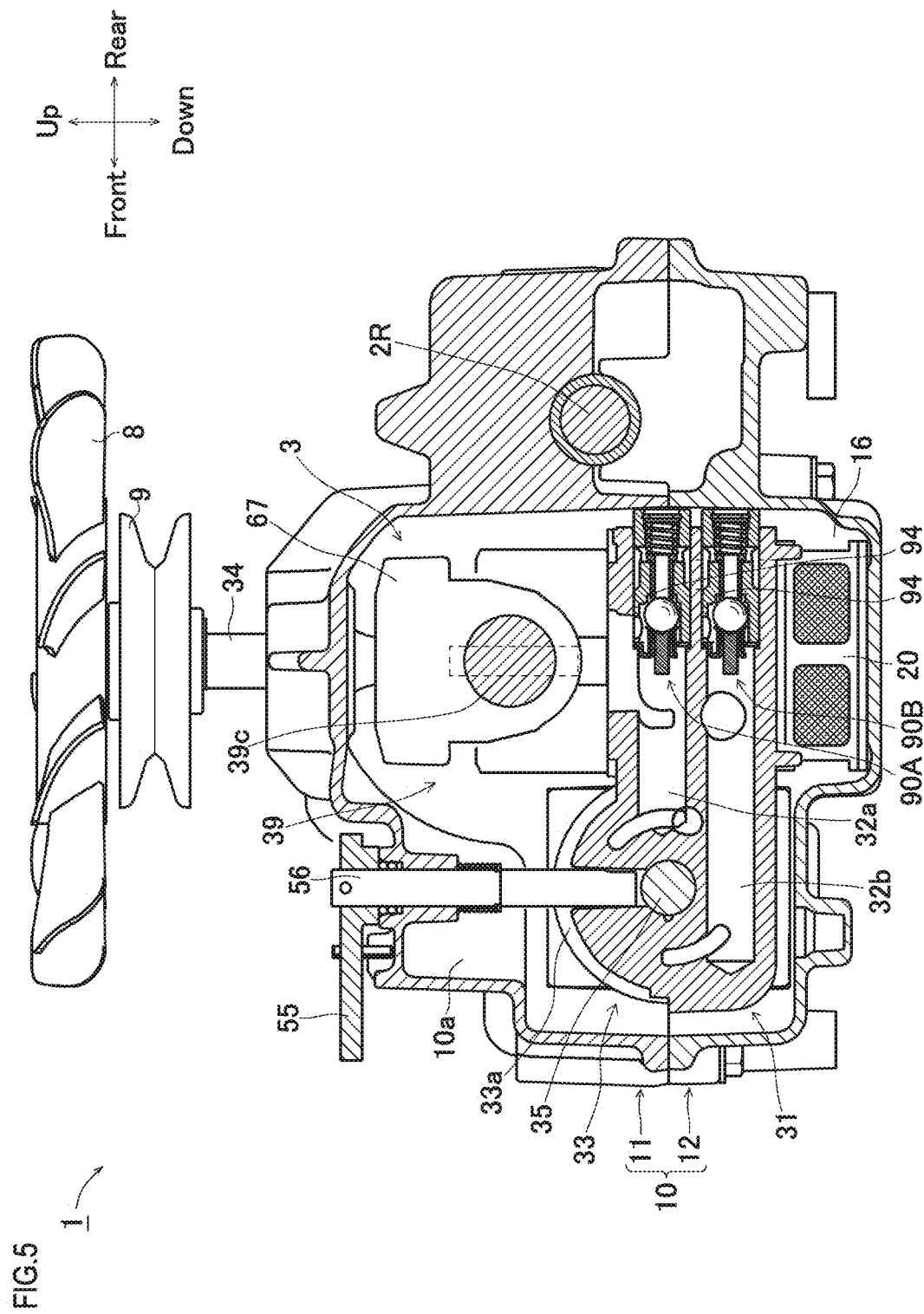
FIG. 5 is a partial cross-sectional arrow view of the transaxle taken along line C-C in FIG. 1.

As shown in FIG. 5, a bypass operation lever 55 to open the oil passages 32a and 32b to the oil reservoir is arranged above the upper housing 11 so as to enable the axle to idly rotate at a time of towing. A base of the bypass operation lever 55 is fixed to an upper end of a bypass lever shaft 56 that is axially supported to be turnable in a vertical direction on an upper wall of the upper housing 11, while a lower end of the bypass lever shaft 56 extends into the center case 31.

Further, inside the center case 31, there is disposed a push pin 57 (see FIG. 9) capable of abutting against a rotational sliding surface of the cylinder block 33a supported by the center case 31, and an end surface of the push pin 57 is configured to abut against a flat surface formed on a lower end side surface of the bypass lever shaft 56. Then, when the driver operates the bypass operation lever 55 outside the housing at a time of towing of the vehicle, the bypass lever shaft 56 is turned, and the flat surface of the lower end thereof is inclined to push the push pin 57 toward the cylinder block 33a. Then, the push pin 57 releases the close contact between the vertical surface 31a and the cylinder block 33a, the oil passages 32a and 32b communicate with the oil reservoir in the transaxle case 10, and the output shaft 35 can freely rotate.

A hydraulic circuit will be described. As shown in FIGS. 5 and 6, the transaxle 1 includes an oil filter 20. The lower housing 12 of the transaxle 1 has a lower portion serving as the oil reservoir 16, and the transaxle case 10 houses: the HST 3 configured by fluidly connecting the hydraulic pump 39 of a variable displacement type to the fixed displacement hydraulic motor 33 through a closed circuit; the output shaft 35 of the hydraulic motor 33; and the reduction gear train 4 therein.

The HST 3 in the transaxle case 10 is configured by fluidly connecting the hydraulic pump 39 to the hydraulic motor 33 by a pair of oil passages 32a and 32b.

The transaxle 1 is configured such that, when the hydraulic oil circulating in the closed circuit decreases to have a negative pressure, the hydraulic oil is self-primed from the oil reservoir 16 through the oil filter 20, and supplied to a closed circuit between the hydraulic pump 39 and the hydraulic motor 33 of the HST 3 (a low pressure side of the pair of oil passages 32a and 32b) via the neutral charge check valves 90A and 90B.

The neutral charge check valves 90A and 90B are respectively provided with orifices 94 and 94 that automatically open near the neutral position. When the neutral zone of the HST 3 is expanded by releasing a small amount of hydraulic oil through the orifices 94 and 94 from the first oil passage 32a or the second oil passage 32b on a high pressure side, and the movable swash plate 39a reaches within a certain play including a normal neutral position, the hydraulic pressure of the first oil passage 32a or the second oil passage 32b immediately becomes zero, and the hydraulic motor 33 and the axles 2L and 2R are reliably stopped.

Figure 2:
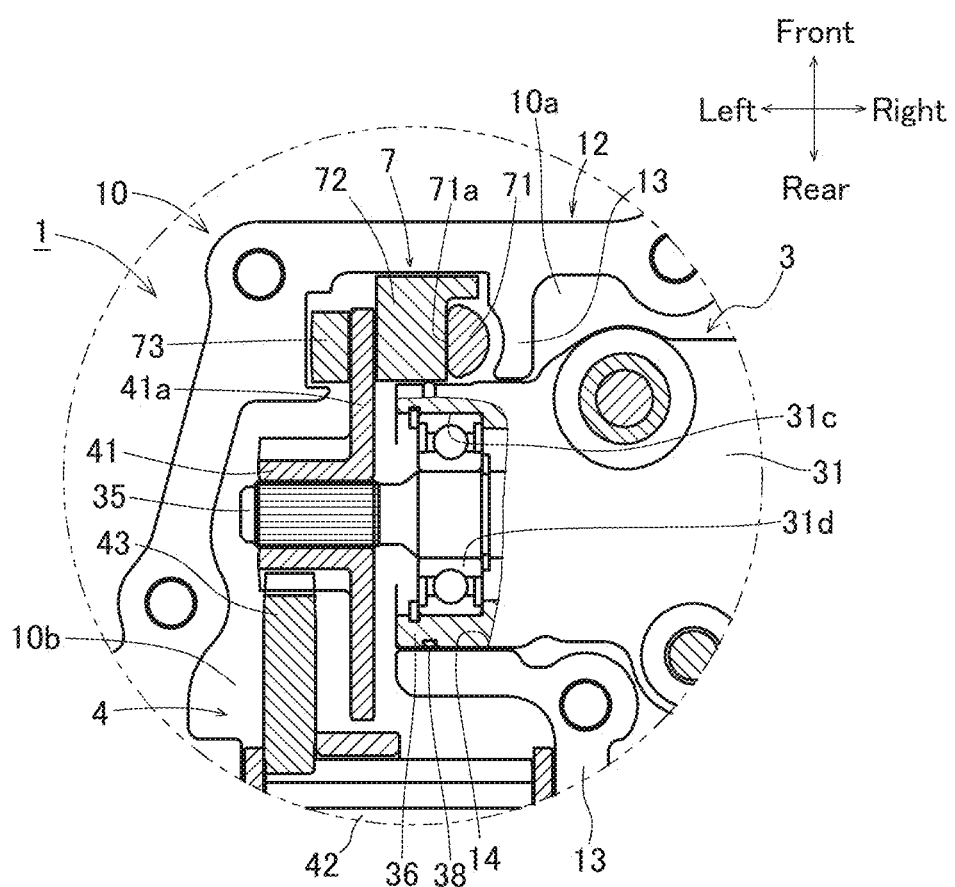
FIG. 2 is a partially enlarged cross-sectional view showing a shaft support part.

As shown in FIGS. 1 and 2, the shaft support part 36 is a substantially cylindrical portion to rotatably support the left portion of the output shaft 35, extends leftward from the front half of the center case 31, passes through a partition wall 13 that is formed in the transaxle case 10 so as to define the left side of the HST chamber 10a, and projects into a front portion of the gear chamber 10b. Then, the output shaft 35 is configured to further protrude from the shaft support part 36 toward the gear chamber 10b, and have an end portion being positioned outside the shaft support part 36. Then, the hydraulic motor 33 of the HST 3 is linked to the reduction gear train 4 via a motor output gear 41 fixed on the output shaft 35.

Thus, in the output shaft 35 of the hydraulic motor 33, the right portion is axially supported by the shaft hole 31b formed in the center case 31, and the left portion is axially supported by a bearing 31d fitted into a shaft hole 31c inside the shaft support part 36. That is, the output shaft 35 is axially supported at two positions in shaft holes 31b and 31c formed in the center case 31, which is a single member.

Here, since both the shaft hole 31b and the shaft hole 31c are coaxial holes formed together in the center case 31, and are portions that can be simultaneously adjusted by machining, it is easy to axially align each of the shaft holes 31b and 31c accurately. Therefore, in the transaxle 1, the axial alignment of the shaft holes 31b and 31c is improved, which enables suppression of axial deviation of the output shaft 35 supported by each of the shaft holes 31b and 31c.

Figure 4:
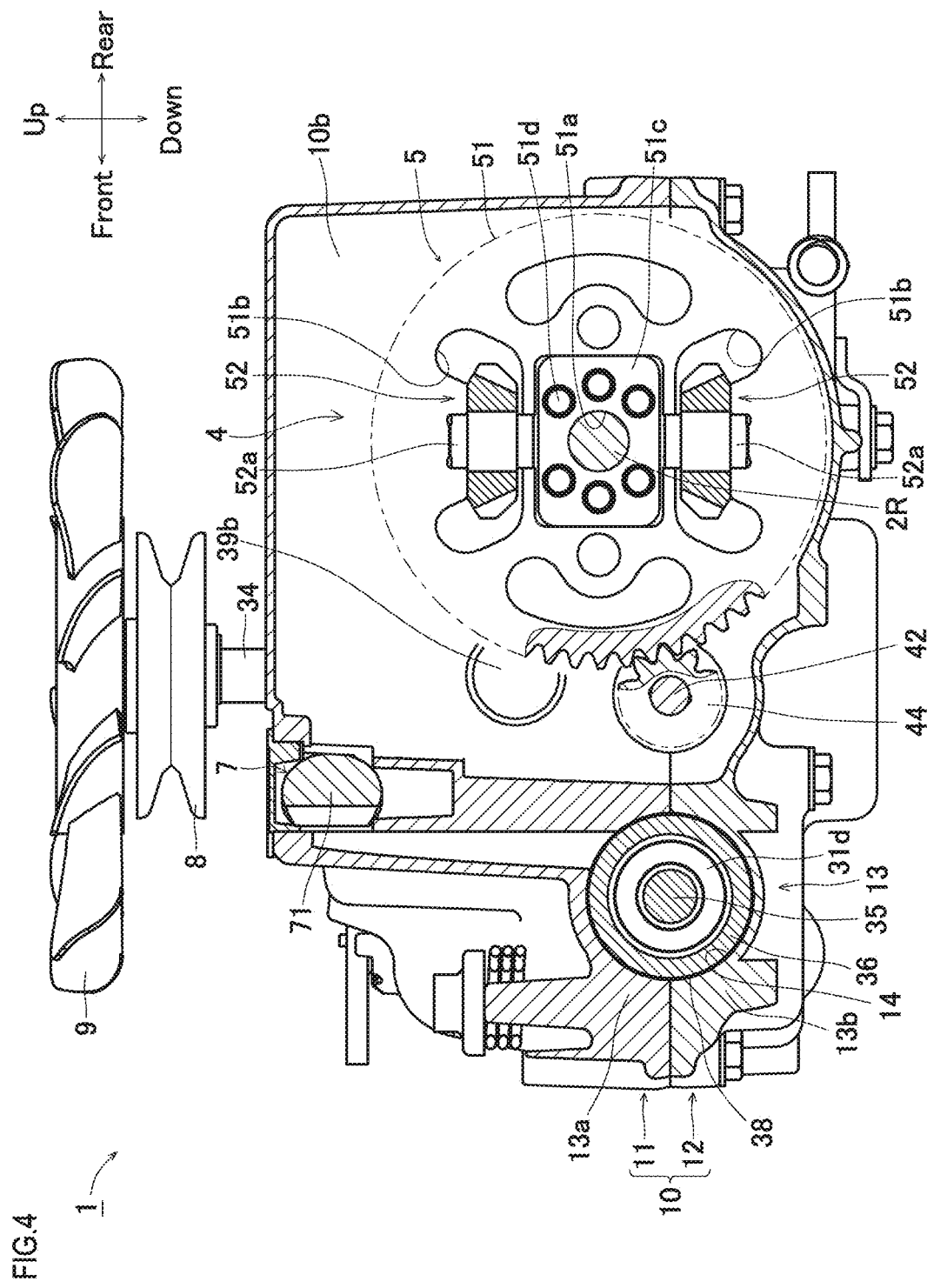
FIG. 4 is a partial cross-sectional arrow view of the transaxle taken along line B-B in FIG. 1.

As shown in FIGS. 1, 3, and 4, the reduction gear train 4 disposed in the gear chamber 10b includes the motor output gear 41, a counter shaft 42, a large diameter counter gear 43, a small diameter counter gear 44, and the ring gear 51 that is also an input gear of the differential gear device 5. The motor output gear 41 is fixed to a left end portion of the output shaft 35 in the gear chamber 10b. The counter shaft 42 extends in a laterally horizontal direction, and is disposed between the output shaft 35 in front thereof and the differential gear device 5 in the rear thereof, in the gear chamber 10b.

The small diameter counter gear 44 is mounted on the counter shaft 42, extends along the counter shaft 42 between the left and right sides of a middle in front-back portion of the gear chamber 10b, and has a rear end being meshed with the ring gear 51. The large diameter counter gear 43 is fixed to the small diameter counter gear 44, and a front end of the large diameter counter gear 43 is meshed with the motor output gear 41. Thus, the reduction gear train 4 is configured to transmit power from the output shaft 35 to the ring gear 51 via the motor output gear 41, the large diameter counter gear 43, and the small diameter counter gear 44.

As shown in FIG. 3, a rotation sensor 45 is arranged close to a left side tip of the large diameter counter gear 43 in the reduction gear train 4. The rotation sensor 45 is an electromagnetic pickup sensor capable of detecting a rotational direction, and is attached using a hole 11a that is provided on a left side surface of the upper housing 11 covering the gear chamber 10b in order to process a support hole of the second trunnion shaft 39c. The rotation sensor 45 is configured to detect a rotational direction of the large diameter counter gear 43, and detect whether the transaxle 1 is in the forward movement state or backward movement state.

As shown in FIGS. 1 and 2, a brake device 7 to brake the output shaft 35 is disposed in a front end portion of the gear chamber 10b. In association with this, the motor output gear 41 is formed with a flange as a brake disc 41a. The brake device 7 includes a vertical cam shaft 71 as an example of a brake shaft part, a brake shoe 72, and a brake pad 73. The brake shoe 72 and the brake pad 73 are an example of a brake part to brake each of the axles 2L and 2R.

The cam shaft 71 is pivotally supported by the transaxle case 10, and an upper part thereof protrudes upward from the transaxle case 10. Whereas, in the gear chamber 10b, the cam shaft 71 is formed with a portion with a semicircular cross section having a vertical cam surface 71a. The cam surface 71a faces the brake shoe 72 disposed between the cam shaft 71 and a front end portion of the brake disc 41a.

The brake pad 73 is mounted on a wall of the transaxle case 10, and the front end portion of the brake disc 41a is disposed between the brake shoe 72 and the brake pad 73. Normally, as shown in FIG. 1, the cam shaft 71 is positioned in a turning direction such that the cam surface 71a is positioned at a non-braking position extending parallel to the brake shoe 72. This causes the brake disc 41a to be separated from the brake shoe 72 and the brake pad 73, and maintains rotation of the output shaft 35 in a state where the brake is not applied.

Figure 8:
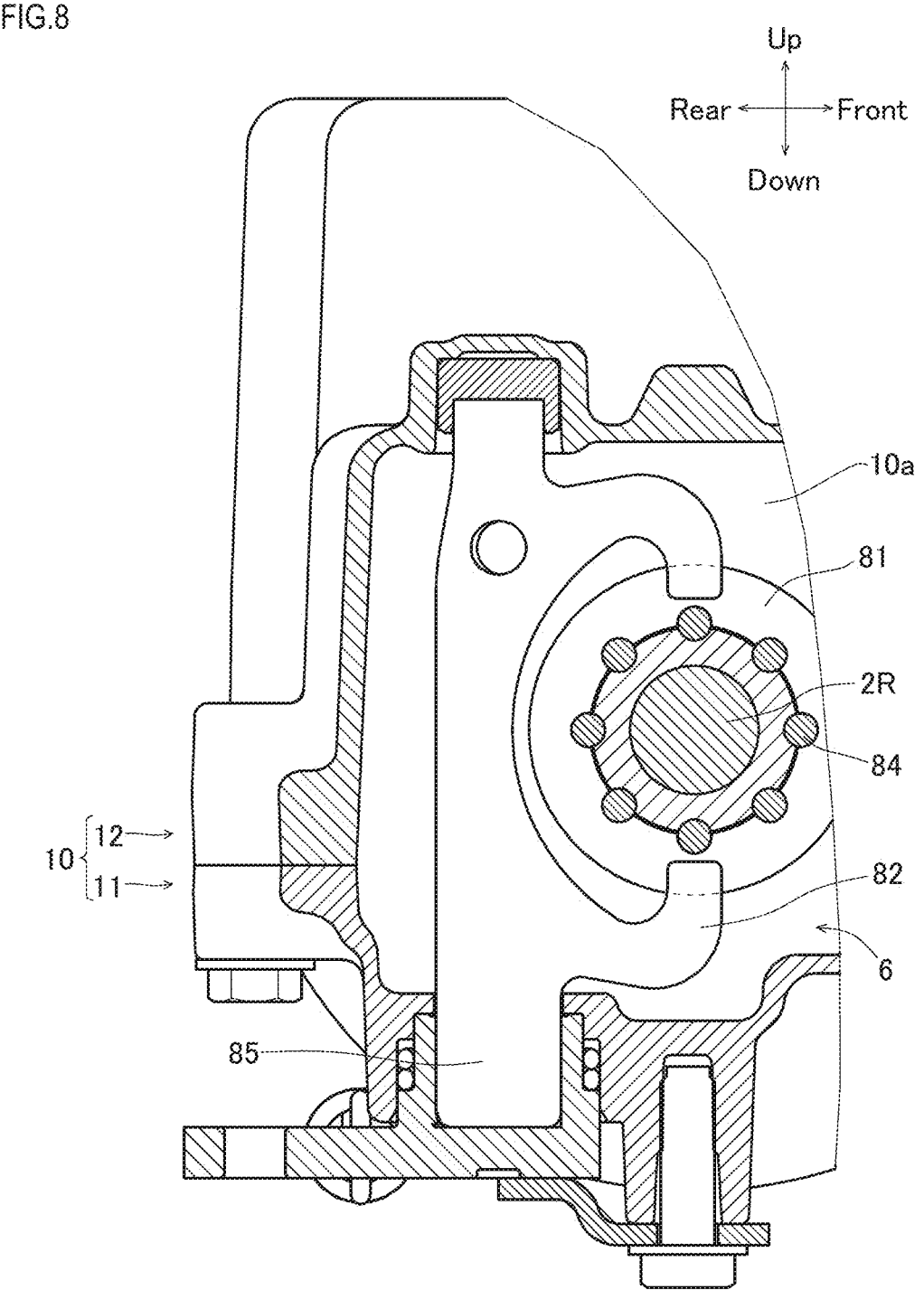
FIG. 8 is a partial cross-sectional view showing a differential lock mechanism.

As shown in FIGS. 1, 4, and 8, the differential gear device 5 includes the ring gear 51, two pinion gears 52, a first side gear 53, and a second side gear 54. As shown in FIG. 3, the ring gear 51 has a shaft hole 51a, two gear holes 51b, and a plate 51c formed with a fitting hole. The shaft hole 51a is a through hole formed at a center of the ring gear 51, and is to receive the left axle 2L and the right axle 2R. The gear holes 51b are through holes individually formed on both sides of the shaft hole 51a, and are to receive the pinion gear 52. The plate 51c is to receive the differential lock mechanism 6.

The pair of pinion gears 52 is made rotatable via a support shaft 52a individually in the gear holes 51b of the ring gear 51. The first side gear 53 is disposed on a left side surface, which is one side surface of the ring gear 51, and is spline-fitted to the left axle 2L. The second side gear 54 is disposed on a right side surface, which is another side surface of the ring gear 51, and is spline-fitted to the right axle 2R. The first and second side gears 53 and 54 are respectively meshed with the two pinion gears 52.

According to such a differential gear device 5, the left axle 2L and the right axle 2R can be differentially rotated.

As shown in FIGS. 1, 4, and 8, the differential lock mechanism 6 is configured by combination of a differential lock slider 81, a differential lock fork 82, and a spring 83. Here, the plate 51c of the ring gear 51 is formed with a recess 51d to be fitted with a differential lock pin 84. In correspondence to the recess 51d, the differential lock pin 84 is provided to protrude on a side of the differential lock slider 81 facing the ring gear 51.

As a position of the differential lock slider 81, the differential lock slider 81 is switched to either of a differential lock position on the left axle 2L side and a differential lock release position on the right axle 2R side, by the turning of the differential lock fork 82 turning in response to turning of a turning shaft 85 by an operation of a differential lock arm 85a. The differential lock slider 81 is always urged by the spring 83 in a direction of the differential lock release position. The differential lock mechanism 6 can be operated by the driver turning the turning shaft 85 against the spring force of the spring 83, and displacing the differential lock slider 81 to the differential lock position where the differential lock pin 84 is inserted into the recess 51d.

As shown in FIGS. 1 to 4, the transaxle 1 is provided with the partition wall 13 that sections the HST chamber 10a and the gear chamber 10b inside the transaxle case 10. The partition wall 13 is configured by an upper partition wall 13a formed in the upper housing 11 and a lower partition wall 13b formed in the lower housing 12. Then, in the partition wall 13 configured by the upper partition wall 13a and the lower partition wall 13b, there is formed a through hole 14 for insertion of the shaft support part 36 of the center case 31 of the HST 3.

The through hole 14 is a substantially circular hole formed in the partition wall 13 and passing through from the HST chamber 10a to the gear chamber 10b. A center of the hole is located on a mating surface of the upper housing 11 and the lower housing 12 (a mating surface of the upper partition wall 13a and the lower partition wall 13b).

Then, the transaxle 1 is configured to house the HST 3 in the transaxle case 10 such that the shaft support part 36 is inserted through the through hole 14, and a part of the center case 31 enters the gear chamber 10b.

Since the center case 31 is a member having an oil hole bored therein, it is desirable to secure a certain size or more in order to secure a cross-sectional area of the oil passage, and it is difficult to achieve miniaturization. Therefore, if it is attempted to store the center case 31 having the shaft support part 36 in the HST chamber 10a, it becomes necessary to expand the HST chamber 10a to the right by the provision of the shaft support part 36. This causes the transaxle case 10 to bulge to the right from the current state, leading to an increase in the size of the hydraulic transaxle.

However, even without bulging of the transaxle case 10 to the right, the transaxle 1 can house the center case 31 and the hydraulic motor 33 in the HST chamber 10a by causing the shaft support part 36 provided on the center case 31 to enter the gear chamber 10b side. This avoids an increase in size of the transaxle 1, and realizes a size substantially the same as that of the conventional one.

That is, the transaxle 1 according to an embodiment of the present invention includes: the axles 2L and 2R: the transaxle case 10 that is filled with oil, supports the axles 2L and 2R, and is formed with the HST chamber 10a and the gear chamber 10b therein; the HST 3 housed in the HST chamber 10a and having the hydraulic pump 39, the hydraulic motor 33, and the center case 31 to install and fluidly connect the hydraulic pump 39 and the hydraulic motor 33; and the reduction gear train 4 that is housed in the gear chamber 10b and transmits output of the hydraulic motor 33 to the axles 2L and 2R. The transaxle case 10 has: the partition wall 13 that separates the HST chamber 10a from the gear chamber 10b; and the through hole 14 passing through the partition wall 13. Through the through hole 14, an end portion of the output shaft 35 of the hydraulic motor 33 is connected to the reduction gear train 4 of the gear chamber 10b. The center case 31 has the vertical surface 31a on which the hydraulic motor 33 is installed, and the shaft support part 36 on an opposite side to the vertical surface 31a. The output shaft 35 extends inside the center case 31 toward the vertical surface 31a and the shaft support part 36, and the end portion of the output shaft 35 is positioned outside the shaft support part 36.

Further, the transaxle 1 is configured to seal a gap between an outer peripheral surface of the shaft support part 36 and an inner peripheral surface of the through hole 14 with a seal member 38, when inserting the shaft support part 36 through the through hole 14. With such a configuration, the transaxle 1 inhibits flow of oil in the gear chamber 10b having a large amount of chips and the like into the HST chamber 10a through the through hole 14, and is configured such that the oil in the HST chamber 10a can be maintained in a state with less chips and the like.

Furthermore, in the transaxle 1, the through hole 14 is formed such that the shaft center of the output shaft 35 of the hydraulic motor 33 is arranged on a joint surface of the upper and lower housings 11 and 12. In such a configuration, it is possible to adapt the housings 11 and 12 used in the conventional HSTs having no shaft support part 36 substantially as-is, by simply adjusting dimensions of a portion corresponding to the shaft support part 36 and a size of the through hole 14.

Figure 9:
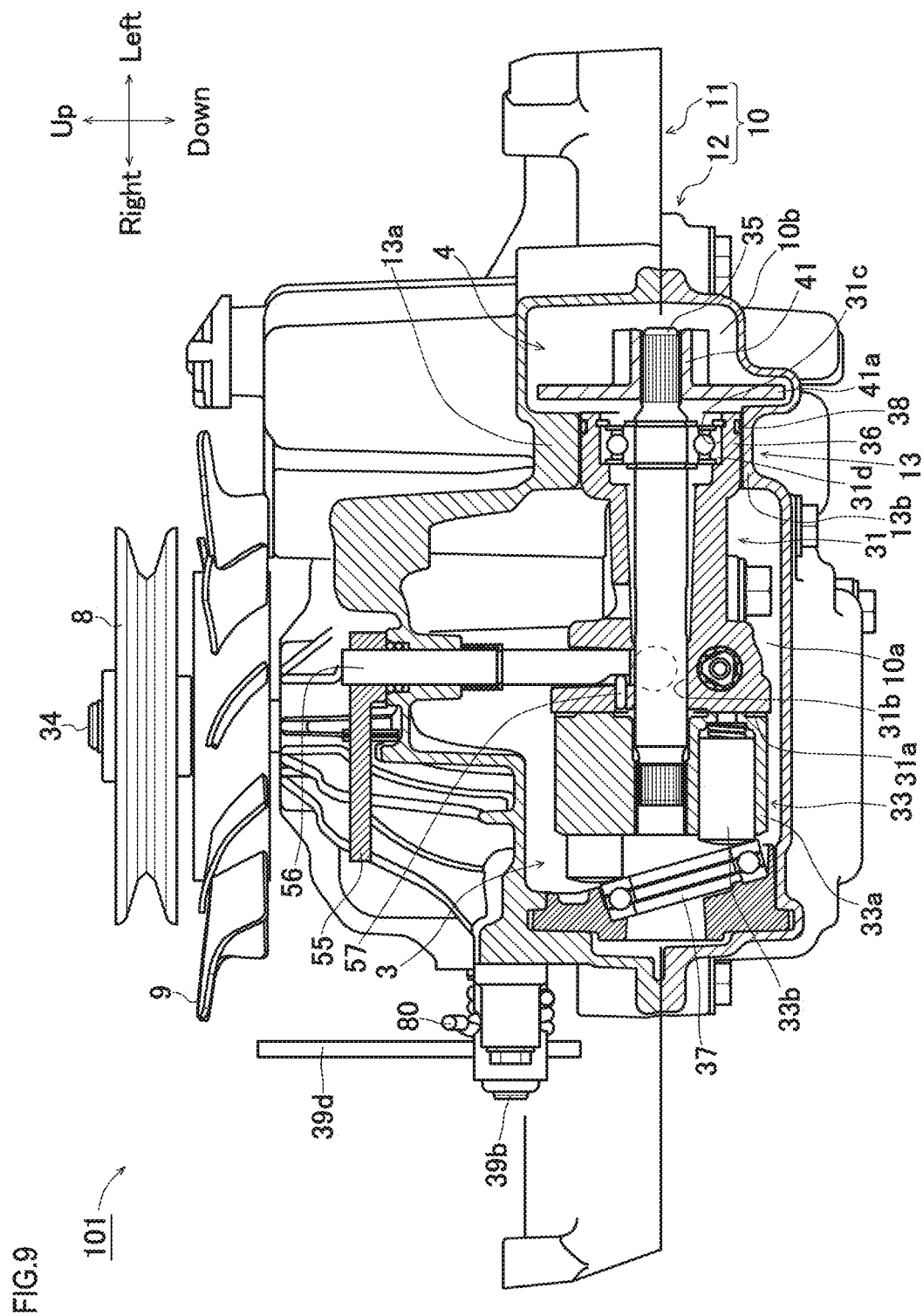
FIG. 9 is a partial cross-sectional view of a transaxle according to another embodiment.

Note that, in the transaxle 1 described above, a case is exemplified where the shaft support part 36 of the center case 31 passes through the partition wall 13 from the HST chamber 10a and projects into the front portion of the gear chamber 10b. However, the shaft support part 36 does not necessarily have to reach the inside of the gear chamber 10b. For example, a transaxle 101 shown in FIG. 9 is another embodiment of the hydraulic transaxle according to the present invention. The transaxle 101 is configured such that a shaft support part 36 is inserted into a through hole 14, and is set within a thickness of a partition wall 13 without protruding toward a gear chamber 10b. According to such a configuration, by extending a center case 31 toward the gear chamber 10b, the transaxle 101 can be made compact as compared with a case where the entire center case 31 is housed in the HST chamber 10a.

Figure 10:
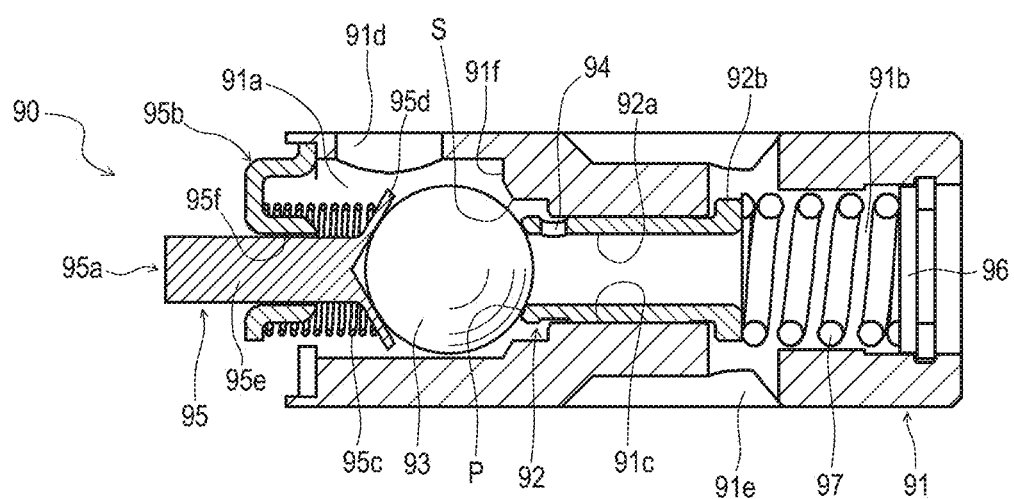
FIG. 10 is a cross-sectional view of a neutral charge check valve.

Here, a configuration of the neutral charge check valve (hereinafter referred to as "NCV") 90 will be described in detail. The HST 3 includes a pair of NCVs 90 as shown in FIG. 10. The NCV 90 is a valve to supply hydraulic oil filled in the transaxle case 10 to an oil passage formed in the HST 3. The NCV 90 includes a valve housing 91, a cylindrical body 92, a valve body 93, and the like.

The valve housing 91 is a cylindrical member, and formed with: a first oil chamber 91a formed at one end portion in a cylinder axial direction; a second oil chamber 91b formed at another end portion in the cylinder axial direction; and a communication hole 91c connecting the first oil chamber 91a and the second oil chamber 91b. Further, the valve housing 91 is formed with: a first open hole 91d to open the first oil chamber 91a to the outside; and a second open hole 91e to open the second oil chamber 91b to the outside.

The cylindrical body 92 is a substantially cylindrical member, is a member to be inserted through the communication hole 91c of the valve housing 91, and includes an oil hole 92a passing through in the cylinder axial direction. At one end portion of the cylindrical body 92 in the cylinder axial direction, a first seat surface P is formed. Further, at another end portion of the cylindrical body 92 in the cylinder axial direction, an enlarged diameter portion 92b is formed. Further, the cylindrical body 92 is opened on an outer peripheral surface at a tip end side thereof, and formed with the orifice 94 that is a hole communicating with the oil hole 92a.

The cylindrical body 92 is inserted through the communication hole 91c from the second oil chamber 91b side of the valve housing 91 with the first seat surface P side first. The cylindrical body 92 is configured to be displaceable in the cylinder axial direction of the valve housing 91, along the communication hole 91c in a state of being inserted through the communication hole 91c.

The valve body 93 is a spherical member, and is disposed in the first oil chamber 91a of the valve housing 91. At an end portion of the first oil chamber 91a on the second oil chamber 91b side, there is formed a stepped portion 91f, which is a portion where an inner diameter of the first oil chamber 91a is reduced to a smaller diameter than a diameter of the valve body 93. The stepped portion 91f includes a second seat surface S, which is a portion in line contact with the valve body 93.

Moreover, the NCV 90 includes a holder 95 in the first oil chamber 91a. The holder 95 is a portion to regulate a displacement range of the valve body 93 and apply an urging force to the valve body 93, and is configured by a holder member 95a, a support member 95b, and a spring member 95c. The holder member 95a includes: a contact part 95d having a conical surface in contact with the valve body 93: and a shaft part 95e to support the holder member 95a with the support member 95b. The holder member 95a is arranged to be inserted through a shaft hole 95f formed in the support member 95b. The shaft hole 95f is formed parallel to the cylinder axial direction of the valve housing 91, and the holder member 95a is displaceable in the cylinder axial direction of the valve housing 91. Between the holder member 95a and the support member 95b, the spring member 95c is interposed. With such a configuration, when the valve body 93 is displaced to a position in contact with the holder 95, the valve body 93 is urged or biased toward the second oil chamber 91b by the spring member 95c.

An end portion of the second oil chamber 91b is closed by a closing plate 96. Then, in the second oil chamber 91b, a spring member 97 is interposed between the cylindrical body 92 inserted through the communication hole 91c and the closing plate 96. The spring member 97 is a member that urges or biases the cylindrical body 92 toward the first oil chamber 91a. The cylindrical body 92 includes the enlarged diameter portion 92b formed on an opposite side to the first seat surface P in the cylinder axial direction, and regulates displacement of the cylindrical body 92 toward the first oil chamber 91a with the enlarged diameter portion 92b.

Then, in the NCV 90, when a pressure in the first oil chamber 91a is increased to a predetermined pressure or more by hydraulic oil supplied through either or both of the first open hole 91d or a gap between support member 95b and the wall of valve housing 91, the valve body 93 is pressed against the first seat surface P to displace the cylindrical body 92 toward the second oil chamber 91b against the spring force of the spring member 97, and the valve body 93 is brought into pressure contact with the second seat surface S. At this time, flow of the hydraulic oil between the first oil chamber 91a and the second oil chamber 91b is shut off, and the hydraulic oil no longer flows from the first open hole 91d to the second open hole 91e.

In addition, in the NCV 90, when a pressure in the second oil chamber 91b is increased to a predetermined pressure or more by hydraulic oil supplied through the second open hole 91e, the valve body 93 is displaced in a direction of separating from the cylindrical body 92 by hydraulic oil supplied to the first oil chamber 91a through the oil hole 92a of the cylindrical body 92. At this time, the hydraulic oil is in a state of being able to flow between the first oil chamber 91a and the second oil chamber 91b, and the hydraulic oil can flow from the second open hole 91e to the first open hole 91d.

Furthermore, in the NCV 90, when a pressure in the first oil chamber 91a is less than a predetermined pressure, and the valve body 93 is in contact with the first seat surface P of the cylindrical body 92 but not in contact with the second seat surface S, the flow of hydraulic oil between the first open hole 91d and the second open hole 91e is enabled through the orifice 94.

Figure 11A:
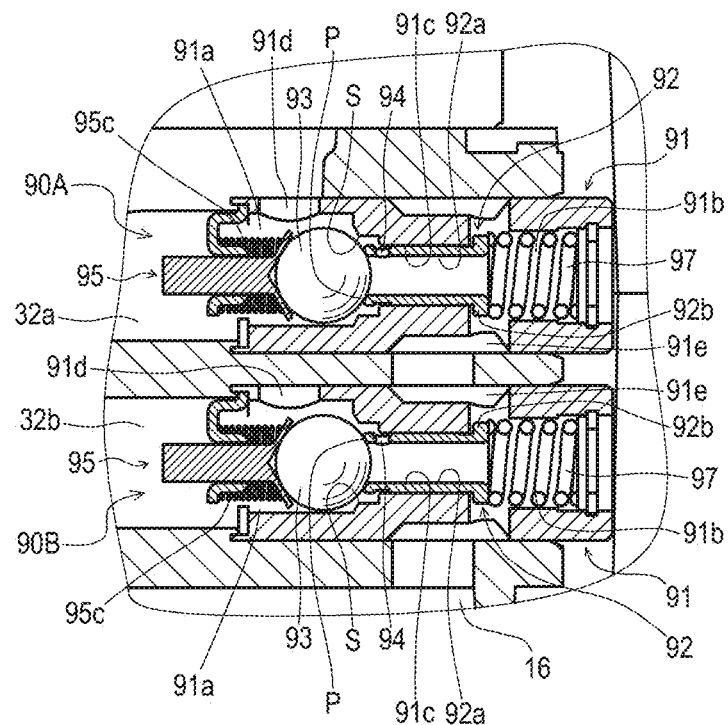
Figure 11B:
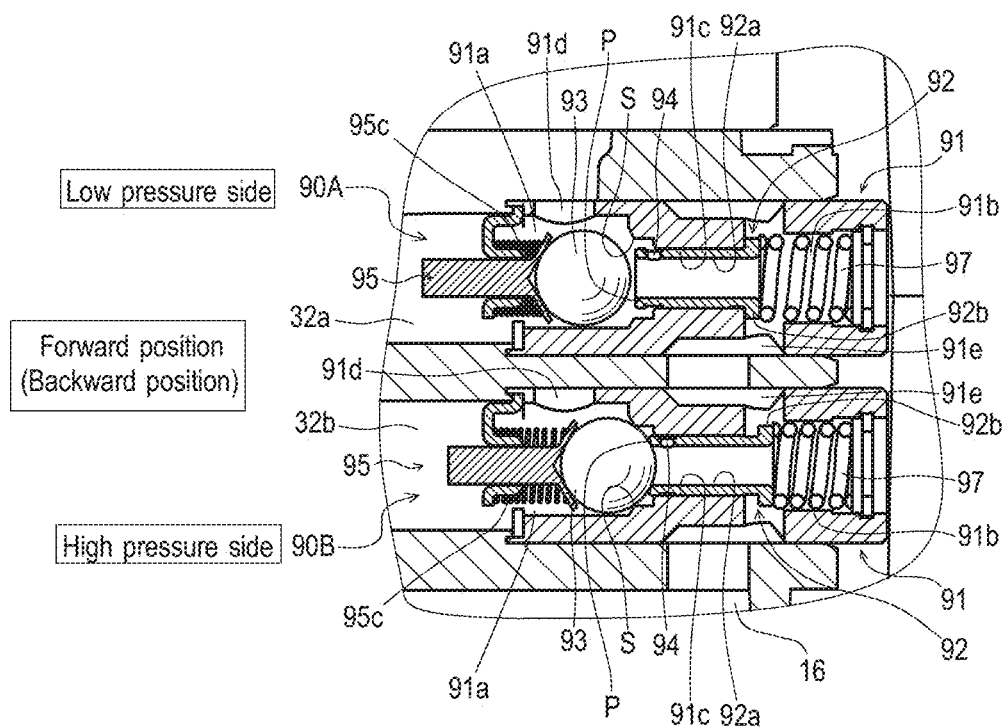

Then, in the HST 3, as shown in FIGS. 11A and 11B, the NCV 90 having such a configuration is individually provided in the first oil passage 32a and the second oil passage 32b formed in the center case 31. In the following description, the NCV 90 provided in the first oil passage 32a is also referred to as a first NCV 90A, and the NCV 90 provided in the second oil passage 32b is also referred to as a second NCV 90B.

An operating condition of the NCV 90 will be described. When the vehicle provided with the HST 3 is stopped, the movable swash plate 39a of the hydraulic pump 39 (see FIG. 3) is in a neutral position, and a suction/discharge amount of the hydraulic pump 39 is substantially zero. At this time, as shown in FIG. 11A, in each of the NCVs 90A and 90B, hydraulic oil can flow between the first open hole 91d and the second open hole 91e through the orifice 94. That is, in this state, the hydraulic oil in the first oil passage 32a and the second oil passage 32b can flow from the first oil chamber 91a side to the second oil chamber 91b side through the orifice 94, and is in a state of being released from the second open hole 91e to the oil reservoir 16.

Further, when the movable swash plate 39a of the hydraulic pump 39 (see FIG. 3) is turned to a position beyond the neutral position, as shown in FIG. 11B, one of the NCVs 90A and 90B (here, the second NCV 90B on the second oil passage 32b side) is to be a high pressure side, and the other (here, the first NCV 90A on the first oil passage 32a side) is to be a low pressure side.

In the second NCV 90B on the high pressure side, when the pressure of the hydraulic oil in the second oil passage 32b falls below an urging or biasing force of the spring member 97, a width of the neutral position is wide since a flowing state of the orifice 94 continues. When the pressure exceeds the urging force, the valve body 93 is displaced toward the second oil chamber 91b against the spring member 97, and the valve body 93 is brought into pressure contact with the second seat surface S. At this time, in the second oil passage 32b, the flow of hydraulic oil from the first oil chamber 91a side to the second oil chamber 91b side is shut off, there is no leakage of hydraulic oil, and a highly efficient operating state is maintained.

In the first NCV 90A on the low pressure side, the valve body 93 is displaced to a position separated from the second seat surface S by an urging or biasing force of the spring member 97. At this time, in the first oil passage 32a, the flow of hydraulic oil from the second oil chamber 91b side to the first oil chamber 91a side is secured, and it is possible to replenish the hydraulic oil from the oil reservoir 16 into the first oil passage 32a through the second open hole 91e.

Thus, while the NCV 90 allows the hydraulic oil to flow between the first oil chamber 91a and the second oil chamber 91b through the orifice 94 near the neutral position, the diameter of the orifice 94 can be increased since the orifice 94 can be closed by the valve body 93 during normal traveling. That is, in the NCV 90, increasing the diameter of the orifice 94 does not deteriorate the transmission efficiency of the HST 3 during normal traveling. Further, in the NCV 90, it is possible to increase an amount of discharged oil at the time of neutral by increasing the diameter of the orifice 94, which can achieve expansion of the neutral range.

Figure 13:
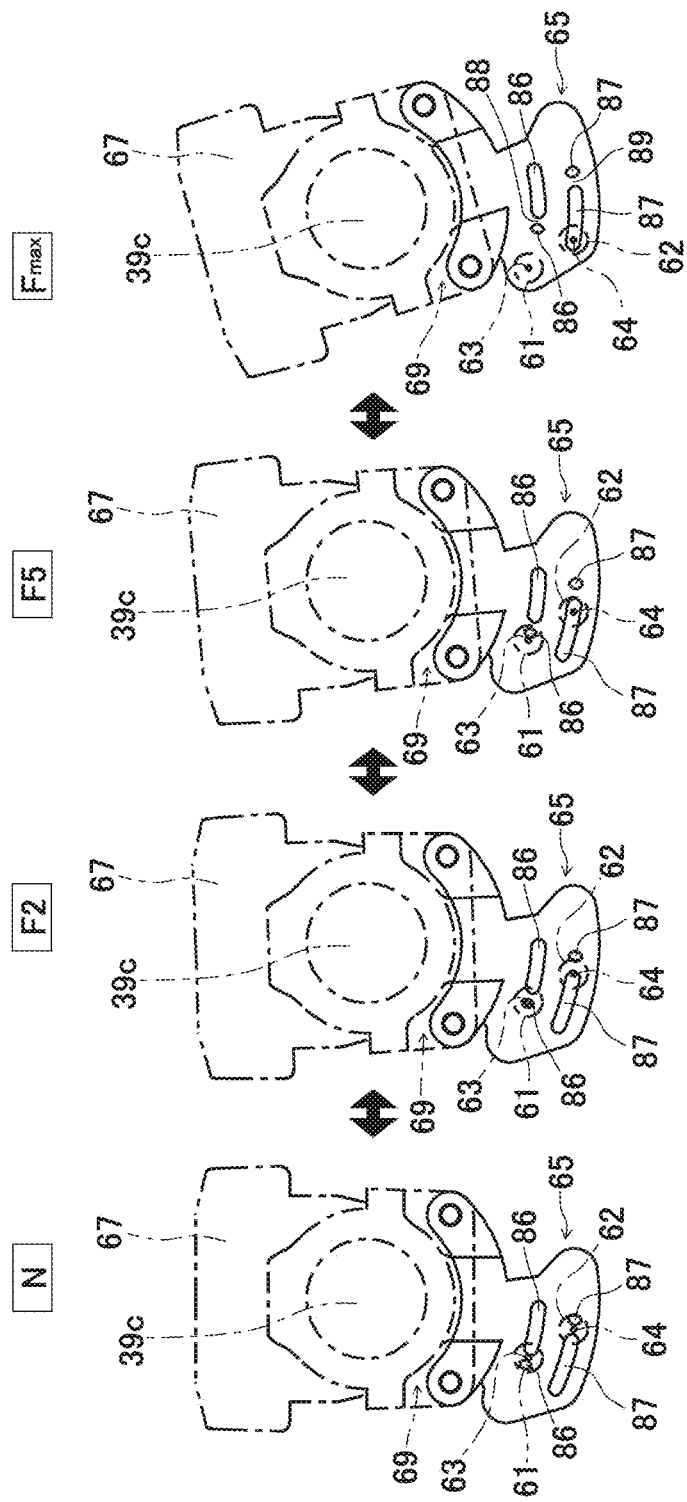
FIG. 13 is a schematic view showing a positional relationship between a plate and an orifice according to a turning position of a movable swash plate at a time of forward movement.
Figure 14:
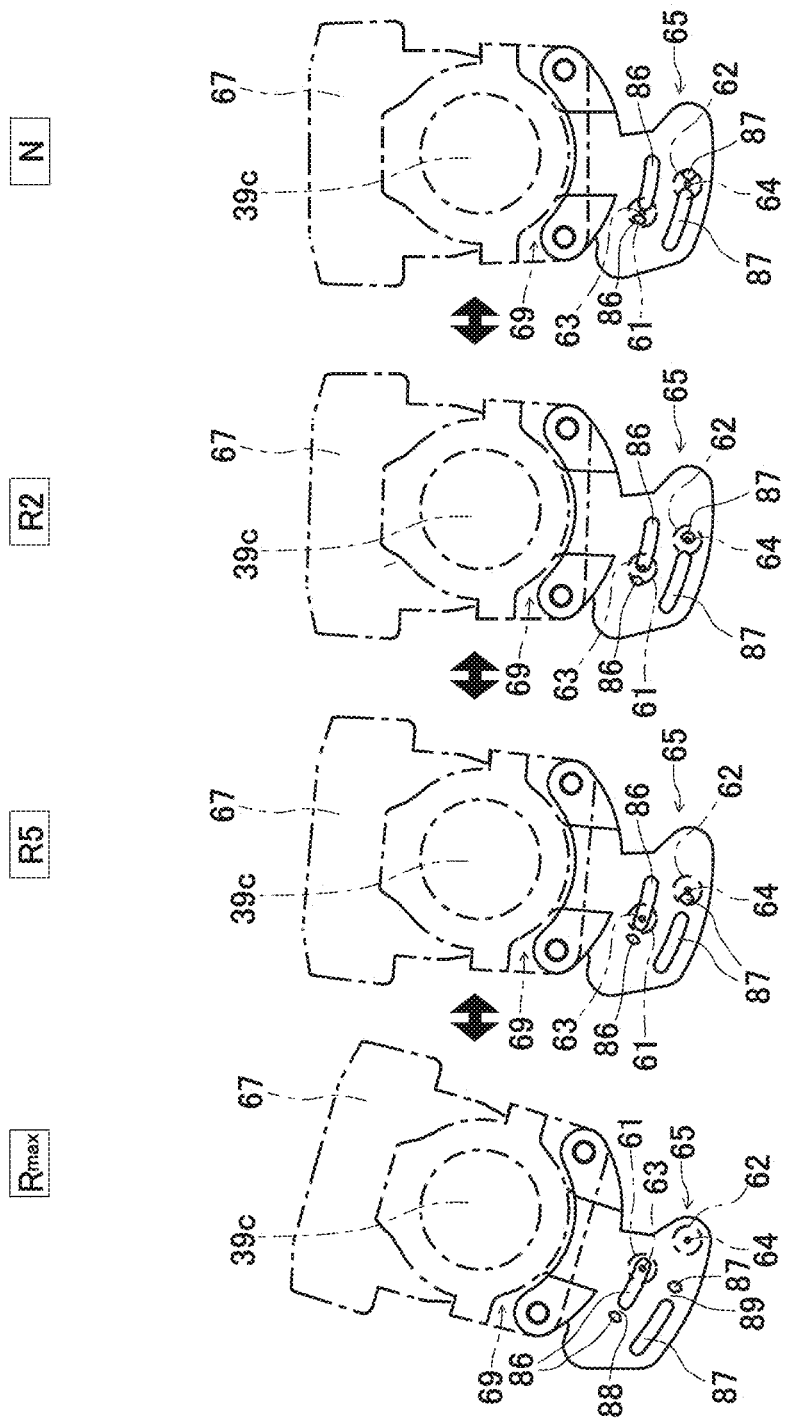
FIG. 14 is a schematic view showing a positional relationship between the plate and the orifice according to a turning position of the movable swash plate at a time of backward movement.

An operating condition of the IDS 60 will be described. FIGS. 13 and 14 show a positional relationship of the grooves 86 and 87 and the sealing parts 88 and 89 in the plate 65 according to a change in a turning position of the movable swash plate main body 67, with the orifices 63 and 64 formed in the respective pistons 61 and 62.

Figure 15:
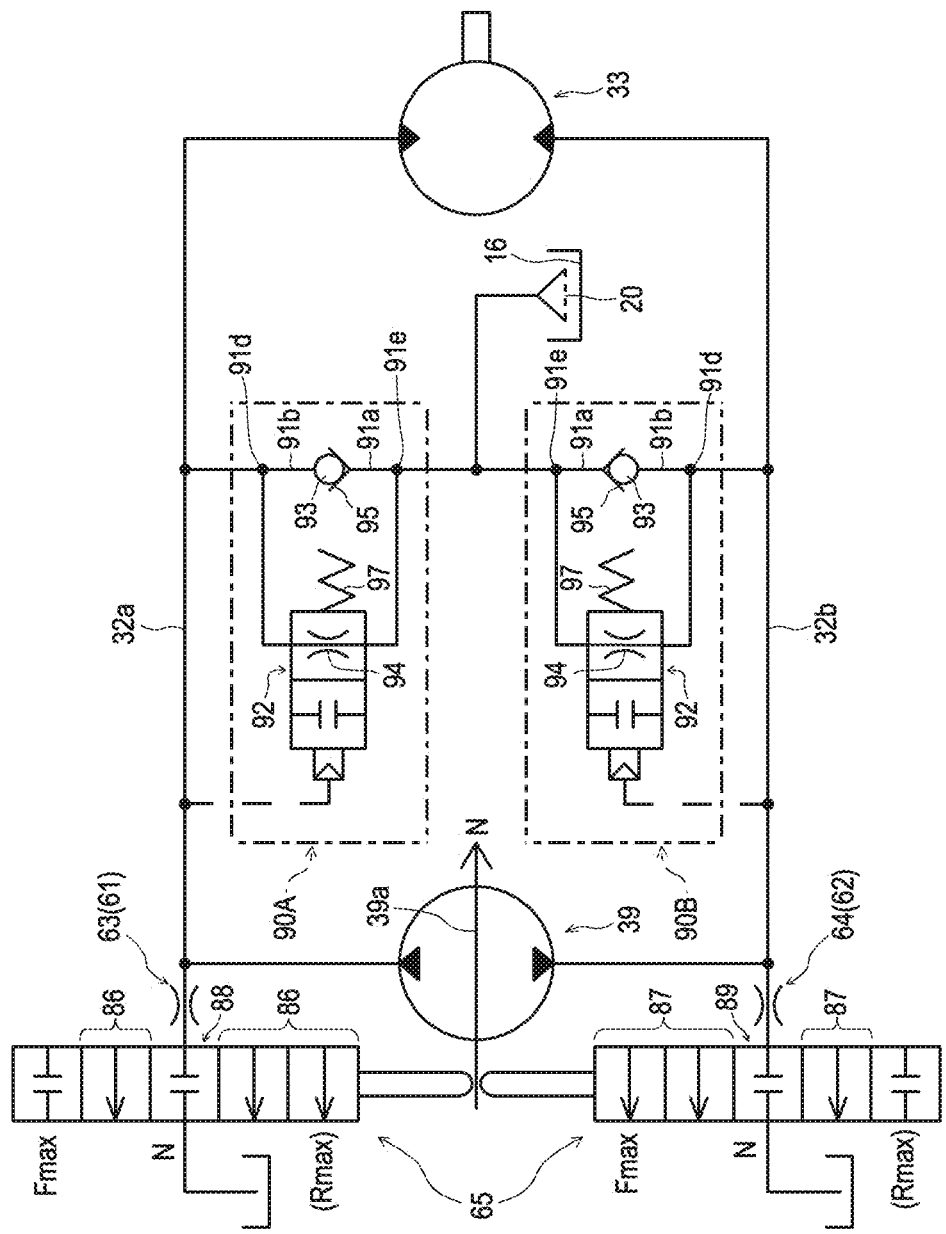
FIG. 15 is a hydraulic circuit diagram showing a connection state of the neutral charge check valve and the internal damping system.

As shown in FIGS. 13 to 15, when the movable swash plate main body 67 is turned to the "N (neutral)" position, the orifice 63 formed in the upper piston 61 is disposed at the sealing part 88 on the groove 86, and the orifice 64 formed in the lower piston 62 is disposed at the sealing part 89 on the groove 87. At this time, there is no discharge of hydraulic oil from each of the orifices 63 and 64.

As shown in FIGS. 13 and 15, when the movable swash plate main body 67 is turned to a position of "F2 (forward side low speed)", the orifice 63 formed in the upper piston 61 is disposed on the groove 86, and the orifice 64 formed in the lower piston 62 is disposed on the groove 87. At this time, from the low-pressure-side orifice 64, hydraulic oil of an amount corresponding to the turning position of the movable swash plate main body 67 is sucked. Further, from the high-pressure-side orifice 63, hydraulic oil of an amount corresponding to the turning position of the movable swash plate main body 67 is discharged, suppressing abrupt acceleration to optimize driving feeling.

Further, when the movable swash plate main body 67 is turned to a position of "F5 (forward side medium speed)", the orifice 63 formed in the upper piston 61 is disposed at a position deviated from the groove 86, and the orifice 64 formed in the lower piston 62 is disposed on the groove 87. At this time, from the low-pressure-side orifice 64, hydraulic oil of an amount corresponding to the turning position of the movable swash plate main body 67 is replenished. The discharge of the hydraulic oil from the high-pressure-side orifice 63 is eliminated, and deterioration of the transmission efficiency is suppressed.

Furthermore, when the movable swash plate main body 67 is turned to a position of "Fmax (forward side maximum speed)", the orifice 63 formed in the upper piston 61 is disposed at a position deviated from the groove 86, and the orifice 64 formed in the lower piston 62 is disposed at the groove 87. At this time, from the low-pressure-side orifice 64, hydraulic oil of an amount corresponding to the turning position of the movable swash plate main body 67 is replenished. The discharge of the hydraulic oil from the high-pressure-side orifice 63 is eliminated, and deterioration of the transmission efficiency is suppressed.

Further, as shown in FIGS. 14 and 15, when the movable swash plate main body 67 is turned to a position of "R2 (backward side low speed)", the orifice 63 formed in the upper piston 61 is disposed on the groove 86, and the orifice 64 formed in the lower piston 62 is disposed on the groove 87. At this time, from the low-pressure-side orifice 63, hydraulic oil of an amount corresponding to the turning position of the movable swash plate main body 67 is replenished. Further, from the high-pressure-side orifice 64, hydraulic oil of an amount corresponding to the turning position of the movable swash plate main body 67 is discharged, suppressing abrupt acceleration to optimize driving feeling.

Further, when the movable swash plate main body 67 is turned to a position of "R5 (backward side medium speed)", the orifice 63 formed in the upper piston 61 is disposed at the groove 86, and the orifice 64 formed in the lower piston 62 is disposed at a position deviated from the groove 87. At this time, from the low-pressure-side orifice 63, hydraulic oil of an amount corresponding to the turning position of the movable swash plate main body 67 is replenished. The discharge of the hydraulic oil from the high-pressure-side orifice 64 is eliminated, and deterioration of the transmission efficiency is suppressed.

Furthermore, when the movable swash plate main body 67 is turned to a position of "Rmax (backward side maximum speed)", the orifice 63 formed in the upper piston 61 is disposed at the groove 86, and the orifice 64 formed in the lower piston 62 is disposed at a position deviated from the groove 87. At this time, from the low-pressure-side orifice 63, hydraulic oil of an amount corresponding to the turning position of the movable swash plate main body 67 is replenished. The discharge of the hydraulic oil from the high-pressure-side orifice 64 is eliminated, and deterioration of the transmission efficiency is suppressed.

An opening and closing condition of the individual orifices when the vehicle provided with the HST 3 is driven on flat ground will be described. As shown in FIG. 1, the HST 3 includes the IDS 60 and the NCVs 90A and 90B.

As shown in FIG. 16A, when the movable swash plate main body 67 is turned to the "N (neutral)" position (see FIGS. 13 to 15), the individual orifices 63 and 64 provided in the IDS 60 are disposed and closed in the sealing parts 88 and 89 on the respective grooves 86 and 87. Whereas, the individual orifices 94 and 94 provided in the respective NCVs 90A and 90B are open (see FIG. 11A).

In the neutral position, if an opening area of the orifice is large, there is an advantage of being easy to secure the neutral position, but there is a point that responsiveness at a time of starting is sacrificed. In the HST 3 of this configuration, while obtaining the advantage of being easy to secure the neutral position by opening the orifices 94 and 94 of the respective NCV 90A and 90B, it is possible to secure responsiveness at a time of starting by closing the orifices 63 and 64 of the IDS 60.

Next, when the movable swash plate main body 67 is turned to the position of "F2 (forward side low speed)" (see FIGS. 13 and 15), the high-pressure-side orifice 63 provided in the IDS 60 is opened. From the high-pressure-side orifice 63, hydraulic oil of an amount corresponding to the turning position of the movable swash plate main body 67 is discharged, suppressing abrupt acceleration to optimize driving feeling. Moreover, at this time, from the low-pressure-side orifice 64, hydraulic oil of an amount corresponding to the turning position of the movable swash plate main body 67 is replenished.

Further, at this time, the respective orifices 94 and 94 of the NCVs 90A and 90B are also simultaneously opened (see FIG. 11A). That is, the individual NCVs 90A and 90B are configured such that the respective orifices 94 and 94 are disposed at the same position as in the neutral state, up to a range beyond the neutral position. At this time, from the orifice 94 on the high pressure side (the first oil passage 32*a* side), hydraulic oil of an amount corresponding to the pressure in the oil passage is discharged, suppressing abrupt acceleration to optimize driving feeling.

In the HST 3, in a region for traveling at a low speed (slightly beyond neutral), such a configuration suppresses an occurrence of jerky motion during acceleration and deceleration, by allowing an amount of hydraulic oil to be returned to the oil reservoir 16 by each of the orifices 63, 64, and 94.

Next, when the movable swash plate main body 67 is turned to the position of "F5 (forward side medium speed)", the high-pressure-side orifice 63 provided in the IDS 60 is closed. Moreover, from the low-pressure-side orifice 64 via the groove 87, hydraulic oil of an amount corresponding to the turning position of the movable swash plate main body 67 is replenished. Further, at this time, the orifice 94 provided in the NCV 90 on the high-pressure side is also simultaneously closed (see FIG. 11B).

Further, when the movable swash plate main body 67 is turned to the position of "Fmax (forward side maximum speed)", the high-pressure-side orifice 63 provided in the IDS 60 is closed. Moreover, from the low-pressure-side orifice 64 via the groove 87, hydraulic oil of an amount corresponding to the turning position of the movable swash plate main body 67 is replenished. Further, at this time, the orifice 94 provided in the NCV 90 on the high-pressure side is also simultaneously closed (see FIG. 11B).

As described above, in the HST 3, in a region for traveling at a high speed, the hydraulic oil returning to the oil reservoir 16 during high speed traveling is eliminated, and deterioration of transmission efficiency during high speed traveling is suppressed by reliably closing the high-pressure-side orifices 63 and 94.

Here, although the operation of the HST 3 at the time of forward movement is exemplified in the above description and corresponding FIG. 16A, the operation of the HST 3 in reverse is similar (however, the high pressure side and the low pressure side are switched).

An opening and closing condition of the individual orifices in a state where the vehicle provided with the HST 3 is stopped on a slope will be described. As shown in FIG. 16B, when the movable swash plate main body 67 is turned to the "N (neutral)" position (see FIGS. 13 to 15), the individual orifices 63 and 64 provided in the IDS 60 are disposed and closed in the respective sealing parts 88 and 89.

When the vehicle is stopped on a slope, by an action of the axle to rotate due to the weight of the vehicle, either one of the first oil passage 32a and the second oil passage 32b is brought into a high pressure state, and the other is brought into a low pressure state. Therefore, the orifice 94 provided in the first NCV 90A on the high pressure side is closed. (See FIG. 11B). Meanwhile, the orifice 94 provided in the second NCV 90B on the low pressure side is opened.

When the vehicle is stopped on a slope, if an opening area of the orifice is large, there is a point that the responsiveness at a time of starting is sacrificed. In the HST 3 of this configuration, the startability can be improved without freewheeling in starting the vehicle from a stopped state on a slope, by closing the orifice 94 of the first NCV 90A on the high pressure side, and also closing the orifices 63 and 64 on the IDS 60 side.

Next, in traveling on a slope, when the movable swash plate main body 67 is turned to a position of "F2 (forward side low speed)" (see FIGS. 13 and 15), the high-pressure-side orifice 63 provided in the IDS 60 is open. From the high-pressure-side orifice 63, hydraulic oil of an amount corresponding to the turning position of the movable swash plate main body 67 is discharged, suppressing abrupt acceleration to optimize driving feeling. Further, the orifice 94 provided in the first NCV 90A on the high pressure side is still closed (see FIG. 11B).

As described above, in the HST 3, in a region for traveling on a slope at a low speed, an occurrence of jerky motion during acceleration and deceleration is suppressed by securing an amount of hydraulic oil to be returned to the oil reservoir 16 by the orifice 63 provided to the IDS 60.

Next, when the movable swash plate main body 67 is turned to the position of "F5 (forward side medium speed)", the high-pressure-side orifice 63 provided in the IDS 60 is closed. Further, at this time, the orifice 94 provided in the first NCV 90A on the high pressure side is still closed (see FIG. 11B).

Further, when the movable swash plate main body 67 is turned to a position of "Fmax (forward side maximum speed)" as well, the high-pressure-side orifice 63 provided in the IDS 60 is closed, and the orifice 94 provided in the first NCV 90A on the high pressure side is also closed (see FIG. 11B).

As described above, in the HST 3, in a region for traveling on a slope at a high speed, the hydraulic oil returning to the oil reservoir 16 during high speed traveling is eliminated, and deterioration of efficiency during high speed traveling is suppressed by reliably closing each of the high-pressure-side orifices 63 and 94.

Here, although the operation of the HST 3 at the time of forward movement is exemplified, the operation of the HST 3 at in reverse is similar (however, the high pressure side and the low pressure side are switched).

What is claimed is:

1. A traveling hydraulic stepless transmission, comprising:
    a hydraulic pump;
    a movable swash plate disposed in the hydraulic pump;
    a hydraulic motor;
    a closed circuit that fluidly connects the hydraulic pump and the hydraulic motor comprising a first oil passage and a second oil passage; and
    an internal damping system comprising:
        a pair of pistons individually disposed in each of the first oil passage and the second oil passage;
        a plate that cooperates with the movable swash plate and is in sliding contact with the pair of pistons;
        a respective hole disposed on a surface of each of the pair of pistons in contact with the plate; and
        a pair of grooves formed on a surface of the plate in contact with the pistons, each of the grooves formed in a portion of a path the hole disposed on each of the pistons traces on the surface of the plate when the plate is moved,
    wherein the plate is configured to be attachable to and detachable from one of a pair of trunnion shafts.

2. The traveling hydraulic stepless transmission according to claim 1, wherein the plate comprises a sealing part that seals the hole in the pistons when the plate is turned to a neutral position.

3. The traveling hydraulic stepless transmission according to claim 1, wherein the movable swash plate is formed with a protrusion having a pair of protrusion-side flat portions parallel to a normal direction of the trunnion shafts of the movable swash plate,
    wherein the plate is formed with a recess having a pair of parallel recess-side flat portions corresponding to the pair of protrusion-side flat portions, and
    wherein the plate is attached to the movable swash plate by fitting the protrusion to the recess.

4. A traveling hydraulic stepless transmission, comprising:
    a tank of hydraulic oil;
    a hydraulic pump of a variable displacement type;
    a capacity adjustment part disposed in the hydraulic pump;
    a hydraulic motor;
    a closed circuit that fluidly connects the hydraulic pump and the hydraulic motor in a closed circuit; and
    a pair of neutral check valves configured for replenishment of hydraulic oil that are disposed individually in each of a first oil passage and a second oil passage of the closed circuit,
    wherein each of the pair of check valves comprises:
        a valve housing that is a cylindrical housing;
            a first oil chamber formed on one end side of the valve housing in a cylinder axial direction;
            a second chamber formed on another end side of the valve housing in the cylinder axial direction;
            a communication hole connecting the first oil chamber and the second chamber;
            an opening to fluidly connect the first oil chamber to the first oil passage or the second oil passage;
            a first open hole to fluidly connect the second chamber to the tank;
            a cylindrical body inserted through the communication hole to be displaceable in the cylinder axial direction, wherein the cylindrical body is formed with an oil hole passing through in a axial direction of the cylindrical body, an orifice opened on an outer peripheral surface of the cylindrical body and communicating with the oil hole, and a first seat surface formed at an end portion on a side facing the first oil chamber;
            a spring member configured to bias the cylindrical body toward the first oil chamber; and
        a valve body housed in the first oil chamber,
            wherein the valve housing is formed with a second seat surface positioned on the first oil chamber side in the cylinder axial direction;
    wherein when a pressure in either the first oil passage or the second oil passage is equal to or less than the biasing force acting on the cylindrical body, the valve body of the corresponding neutral check valve is brought into pressure contact with the first seat surface and separated from the second seat surface by the cylindrical body being displaced to the first oil chamber side, and the first oil passage and the second oil passage are made to fluidly communicate with the tank through the orifice, and wherein when a pressure in the first oil passage or the second oil passage becomes higher than the biasing force of the spring member, the valve body of the corresponding neutral check valve is displaced to the second chamber side against the biasing force of the spring member, and is brought into pressure contact with the second seat surface, which shut off fluid communication between the a high pressure side of the first oil passage or the second oil passage and the tank.

5. The traveling hydraulic stepless transmission according to claim 4, further comprising an internal damping system, comprising:

a pair of pistons individually disposed in the first oil passage and the second oil passage;

a plate connected to a control arm and in sliding contact with the pair of pistons;

a respective hole disposed on a surface of each of the pair of pistons in sliding contact with the plate; and a pair of grooves formed on a surface of the plate in sliding contact with the pair of pistons, each of the grooves formed in a portion of a path the hole formed on each of the pistons traces on the surface of the plate when the plate is moved, wherein the plate is configured to drain hydraulic oil from the first oil passage or the second oil passage to the tank through the groove when the groove is aligned with the hole, wherein oil is drained when the capacity adjustment part passes through a predetermined range extending beyond a neutral position.

* * * * *